United States Patent
Bentall et al.

(10) Patent No.: US 8,675,649 B2
(45) Date of Patent: Mar. 18, 2014

(54) AUDIO NETWORK SYSTEM AND METHOD OF DETECTING TOPOLOGY IN AUDIO SIGNAL TRANSMITTING SYSTEM

(75) Inventors: Nathan Bentall, Oxford (GB); Eamon Hughes, Oxford (GB); Peter Charles Eastty, Oxford (GB); Michael John Hunter Smith, Oxford (GB); Ken Iwayama, Paris (FR); Peter Damien Thorpe, Melbourne (AU); Masahiro Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 474 days.

(21) Appl. No.: 12/620,494

(22) Filed: Nov. 17, 2009

(65) Prior Publication Data
US 2010/0128658 A1    May 27, 2010

(30) Foreign Application Priority Data

| Nov. 18, 2008 | (JP) | ................................ | 2008-294915 |
| Dec. 3, 2008 | (JP) | ................................ | 2008-308864 |
| Dec. 3, 2008 | (JP) | ................................ | 2008-308865 |
| Dec. 3, 2008 | (JP) | ................................ | 2008-308866 |

(51) Int. Cl.
*H04L 12/28*     (2006.01)
*H04L 12/64*     (2006.01)

(52) U.S. Cl.
USPC ............................. 370/389; 709/236; 381/80

(58) Field of Classification Search
None
See application file for complete search history.

(56) References Cited

U.S. PATENT DOCUMENTS

| 5,491,590 | A | 2/1996 | Endo et al. |
| 5,764,917 | A | 6/1998 | Royer et al. |
| 5,912,919 | A | 6/1999 | Lomp et al. |
| 6,751,228 | B1 | 6/2004 | Okamura |
| 7,089,333 | B2 * | 8/2006 | Marinescu et al. ........... 709/248 |
| 8,041,051 | B2 * | 10/2011 | Pilati et al. ....................... 381/79 |
| 8,125,988 | B1 * | 2/2012 | Sullivan et al. ............... 370/389 |

(Continued)

FOREIGN PATENT DOCUMENTS

| EP | 0 936 779 A1 | 8/1999 |
| EP | 1 841 137 A2 | 10/2007 |

(Continued)

OTHER PUBLICATIONS

BIAMP Systems, Audia, Digital Audio Platform, Balcom Kabushiki Kaisha, http://www.balcom.co.jp/cobranet.htm, Sep. 18, 2009.

(Continued)

*Primary Examiner* — Robert Scheibel
(74) *Attorney, Agent, or Firm* — Morrison & Foerster LLP

(57) ABSTRACT

In an audio network system constructed from a main node and a plurality of satellite nodes each having a plurality of ports, the main node generates and transmits a main packet including audio signals of a plurality of channels. Each satellite node selects one of the plurality of ports in turn, and confirms whether the main packet arrives at the selected port every predetermined period or not. When the main packet arrives at the selected port every predetermined period, the main packet is received via the port by continuing selection of the port. In the case where reception of the main packet is lost, one is selected from the plurality of ports in turn, the operation to confirm arrival of the main packet is restarted, and another port at which the main packet arrives at the present stage is automatically found.

7 Claims, 17 Drawing Sheets

(56) References Cited

U.S. PATENT DOCUMENTS

| | | |
|---|---|---|
| 2003/0053548 A1 | 3/2003 | Lee et al. |
| 2007/0253330 A1 | 11/2007 | Tochio et al. |
| 2008/0232380 A1* | 9/2008 | Nakayama .................... 370/400 |
| 2008/0240459 A1* | 10/2008 | Nakayama et al. ............. 381/77 |
| 2009/0304201 A1* | 12/2009 | Bekiares et al. ................ 381/77 |
| 2012/0177062 A1 | 7/2012 | Eastty |
| 2012/0177203 A1 | 7/2012 | Bentall et al. |

FOREIGN PATENT DOCUMENTS

| | | |
|---|---|---|
| EP | 1 901 483 A2 | 3/2008 |
| GB | 2 325 124 A | 11/1998 |
| JP | 59-061248 A | 4/1984 |
| JP | 05-336122 A | 12/1993 |
| JP | 08-051453 A | 2/1996 |
| JP | 09-212163 A | 8/1997 |
| JP | 11-074889 A | 3/1999 |
| JP | 2000-278354 | 10/2000 |
| JP | 2008-099264 A | 4/2004 |

OTHER PUBLICATIONS

European Search Report mailed Mar. 8, 2010, for EP Application No. 09175467.1, seven pages.

Japanese Office Action dated Feb. 5, 2013 for Japanese Patent Application No. 2008-294915, with English translation.

Japanese Office Action dated Feb. 12, 2013 for Japanese Patent Application No. 2008-308866, with English translation.

Notice of Allowance mailed Jul. 26, 2013, for U.S. Appl. No. 13/423,122, filed Mar. 16, 2012, eight pages.

* cited by examiner

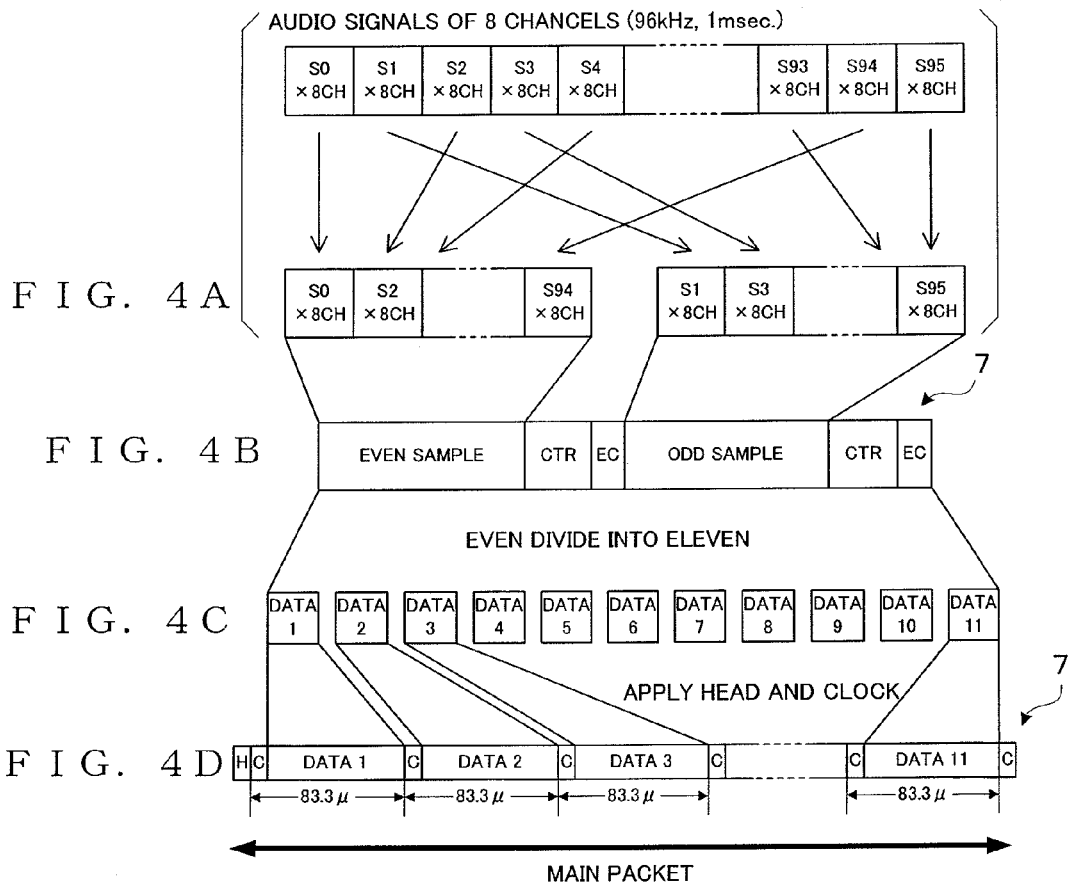
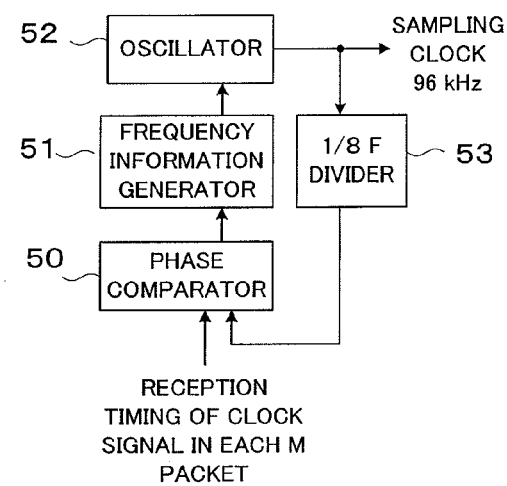
FIG. 6

BEFORE ROUTE SELECTION

AFTER ROUTE SELECTION

CONNECTION CONFIRMATION
MID-FLOW 1

CONNECTION CONFIRMATION
MID-FLOW 2

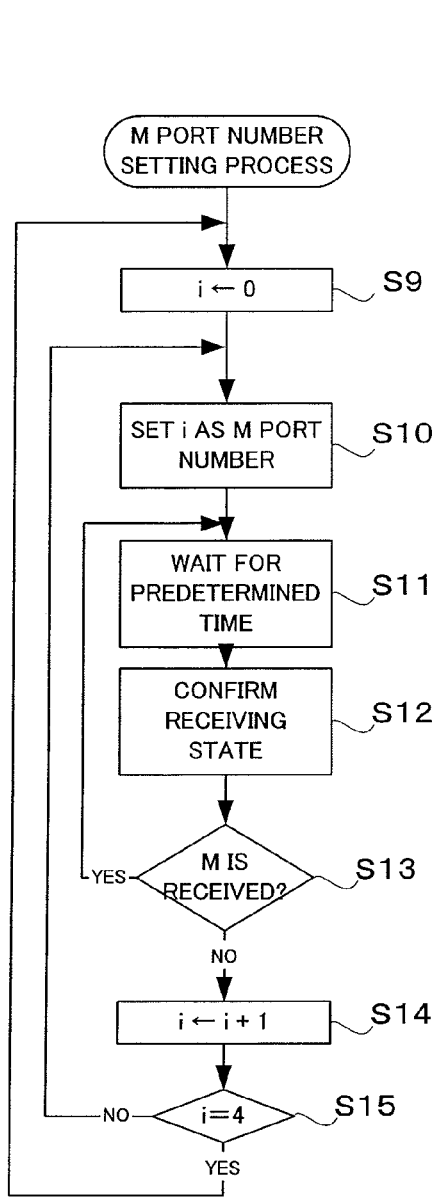
F I G. 1 1
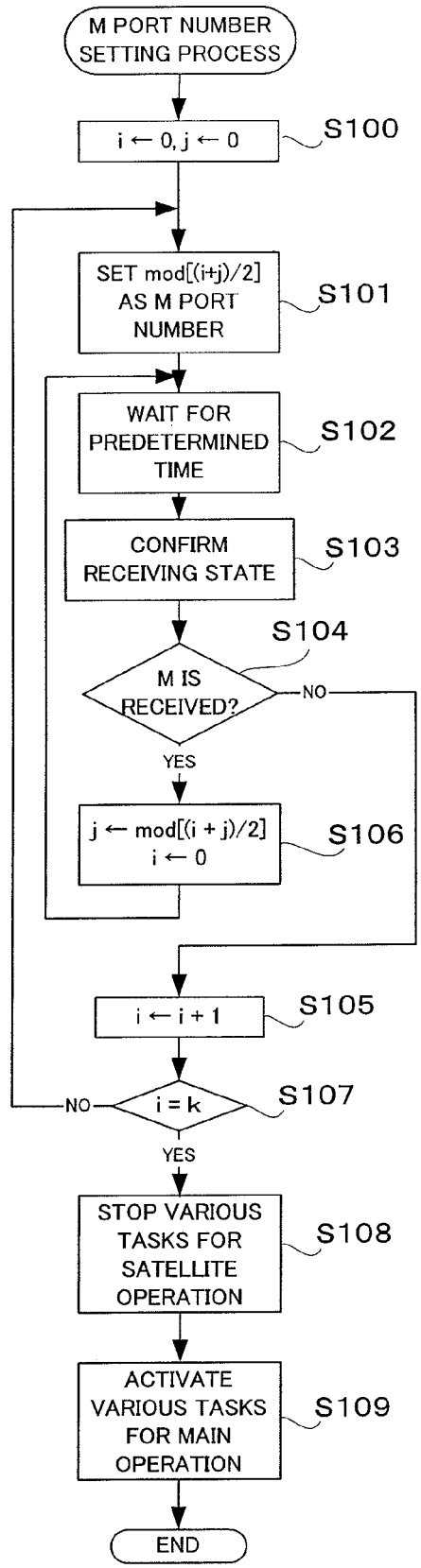
F I G. 1 2

IMMEDIATELY AFTER ROUTE SELECTION

| | | DESTINATION ID | PORT | M |
|---|---|---|---|---|
| M NODE A | P0 | * | – | – |
| | P1 | * | – | – |

FIG. 16A

WHEN P0 OF M NODE IS CHECKED
AND S NODE 0 IS DISCOVERED

| | | DESTINATION ID | PORT | M |
|---|---|---|---|---|
| M NODE A | P0 | B | P0 | – |
| | P1 | * | – | – |
| S NODE 0 B | P0 | A | P0 | 1 |
| | P1 | * | – | 0 |
| | P2 | * | – | 0 |
| | P3 | * | – | 0 |

FIG. 16B

AFTER CHECK OF P1 OF M NODE

| | | DESTINATION ID | PORT | M |
|---|---|---|---|---|
| M NODE A | P0 | B | P0 | – |
| | P1 | ** | – | – |
| S NODE 0 B | P0 | A | P0 | 1 |
| | P1 | * | – | 0 |
| | P2 | * | – | 0 |
| | P3 | * | – | 0 |

FIG. 16C

AFTER CHECK OF P1 OF S NODE

| | | DESTINATION ID | PORT | M |
|---|---|---|---|---|
| M NODE (ID=A) | P0 | B | P0 | – |
| | P1 | ** | – | – |
| S NODE 0 (ID=B) | P0 | A | P0 | 1 |
| | P1 | C | P1 | 0 |
| | P2 | * | – | 0 |
| | P3 | * | – | 0 |
| S NODE 1 (ID=C) | P0 | * | – | 0 |
| | P1 | B | P1 | 1 |
| | P2 | * | – | 0 |
| | P3 | * | – | 0 |

FIG. 16D

AFTER CHECK OF P2, P3 OF S NODE 0

|  |  | DESTINATION ID | PORT | M |
|---|---|---|---|---|
| M NODE (ID=A) | P0 | B | P0 | − |
|  | P1 | ** | − | − |
| S NODE 0 (ID=B) | P0 | A | P0 | 1 |
|  | P1 | C | P1 | 0 |
|  | P2 | D | P1 | 0 |
|  | P3 | ** | − | 0 |
| S NODE 1 (ID=C) | P0 | * | − | 0 |
|  | P1 | B | P1 | 1 |
|  | P2 | * | − | 0 |
|  | P3 | * | − | 0 |
| S NODE 2 (ID=D) | P0 | * | − | 0 |
|  | P1 | B | P2 | 1 |
|  | P2 | * | − | 0 |
|  | P3 | * | − | 0 |

FIG. 16E

AFTER CHECK OF ALL S PORTS OF S NODES 1, 2, 3

|  |  | DESTINATION ID | PORT | M |
|---|---|---|---|---|
| M NODE (ID=A) | P0 | B | P0 | − |
|  | P1 | ** | − | − |
| S NODE 0 (ID=B) | P0 | A | P0 | 1 |
|  | P1 | C | P1 | 0 |
|  | P2 | D | P1 | 0 |
|  | P3 | ** | − | 0 |
| S NODE 1 (ID=C) | P0 | E | P0 | 0 |
|  | P1 | B | P1 | 1 |
|  | P2 | ** | − | 0 |
|  | P3 | ** | − | 0 |
| S NODE 2 (ID=D) | P0 | ** | − | 0 |
|  | P1 | B | P2 | 1 |
|  | P2 | ** | − | 0 |
|  | P3 | ** | − | 0 |
| S NODE 3 (ID=E) | P0 | C | P0 | 1 |
|  | P1 | ** | − | 0 |
|  | P2 | ** | − | 0 |
|  | P3 | ** | − | 0 |

FIG. 16F

CONFIRMATION OF
CONNECTION (SPARE WIRE)

| | | DESTINATION ID | PORT | M |
|---|---|---|---|---|
| M NODE (ID=A) | P0 | B | P0 | - |
| | P1 | Null | - | - |
| S NODE 0 (ID=B) | P0 | A | P0 | 1 |
| | P1 | C | P1 | 0 |
| | P2 | D | P1 | 0 |
| | P3 | Null | - | 0 |
| S NODE 1 (ID=C) | P0 | E | P0 | 0 |
| | P1 | B | P1 | 1 |
| | P2 | D | P0 | 0 |
| | P3 | ** | - | 0 |
| S NODE 2 (ID=D) | P0 | C | P2 | 0 |
| | P1 | B | P2 | 1 |
| | P2 | ** | - | 0 |
| | P3 | ** | - | 0 |
| S NODE 3 (ID=E) | P0 | C | P0 | 1 |
| | P1 | ** | - | 0 |
| | P2 | ** | - | 0 |
| | P3 | ** | - | 0 |

FIG. 16G

AFTER CONFIRMATION OF
CONNECTION (SPARE WIRE)

| | | DESTINATION ID | PORT | M |
|---|---|---|---|---|
| M NODE (ID=A) | P0 | B | P0 | - |
| | P1 | Null | - | - |
| S NODE 0 (ID=B) | P0 | A | P0 | 1 |
| | P1 | C | P1 | 0 |
| | P2 | D | P1 | 0 |
| | P3 | Null | - | 0 |
| S NODE 1 (ID=C) | P0 | E | P0 | 0 |
| | P1 | B | P1 | 1 |
| | P2 | D | P0 | 0 |
| | P3 | D | P2 | 0 |
| S NODE 2 (ID=D) | P0 | C | P2 | 0 |
| | P1 | B | P2 | 1 |
| | P2 | C | P3 | 0 |
| | P3 | E | P2 | 0 |
| S NODE 3 (ID=E) | P0 | C | P0 | 1 |
| | P1 | Null | - | 0 |
| | P2 | D | P3 | 0 |
| | P3 | Null | - | 0 |

FIG. 16H

AUDIO NETWORK SYSTEM AND METHOD OF DETECTING TOPOLOGY IN AUDIO SIGNAL TRANSMITTING SYSTEM

CROSS-REFERENCE TO RELATED APPLICATION

This application is based on, and claims priority to, JP PA 2008-294915 filed on 18 Nov. 2008, JP PA 2008-308864 filed on 3 Dec. 2008, JP PA 2008-308865 filed on 3 Dec. 2008 and JP PA 2008-308866 filed on 3 Dec. 2008. The disclosure of the priority applications, in its entirety, including the drawings, claims, and the specification thereof, is incorporated herein by reference.

BACKGROUND OF THE INVENTION

1. Field of the Invention

The present invention relates to a network system constructed from a plurality of nodes, and particularly relates to an audio network system for transmitting audio signals. The present invention also relates to an audio signal transmitting system that transmits an audio signal from a transmitting device to a receiving device in real time. The present invention also relates to a method of detecting topology (network structure) in an audio signal transmitting system that transmits an audio signal from a transmitting device to a receiving device in real time, and to an audio network system with a function to detect topology.

2. Description of the Related Art

Routing (route control) is a technique to find a route for transmitting a packet of information between nodes on a computer network system constructed from a plurality of nodes. When a route is turned out, it is possible to transmit information by repeating transfer between nodes, that is, from an originating node to a node of a final destination along the route. In a conventional computer network system, each node holds a routing table for determining a route in accordance with an address of the destination, determines a route depending on an address added to a packet in accordance with this routing table, and transfers the packet along the determined route.

For example, in the general-purpose network system such as the Internet, in the case where a failure occurs on a route to transfer information (packet), it is possible to avoid the failure by dynamically controlling route information. Controlling route information dynamically is referred to as "dynamic routing". The dynamic routing is a technique to automatically generate and update a routing table in each node, and to autonomously determine another route using existing nodes by each node. The dynamic routing is normally carried out by means of a routing protocol and path determination algorithm. The routing protocol is a protocol for exchanging routing tables between nodes each other. The path determination algorithm is algorithm for generating a routing table in each node. As the path determination algorithm, distance vector algorithm (hereinafter, referred to as "DVA") and link state algorithm (hereinafter, referred to as "LSA") are known.

The DVA is a method of determining an optimum route on the basis of "cost" recorded in a routing table that each node holds. The "cost" is a numerical value assigned to each node, and cost of a route connected between two nodes is expressed by the sum total of costs between nodes through the route. A list of destination nodes (destinations of a packet), cost of a route for each destination, and the most recent node ("next partner (next hop)") with which the node is to interact for each destination are recorded in the routing table.

At a first stage for determining an optimum route in a network, each node holds only information on "which is its neighboring node" and "cost" therebetween as a routing table. Then, data on the routing tables are periodically exchanged between the nodes each other, and the routing table of each of the nodes is updated using the exchanged data. Through this operation, each node records the best "next partner" and the best "cost" for oneself with respect to any destination node in the routing table held by the node, and it is possible to determine the optimum route on the basis of the table.

In the case where a node in the network is left out, in all nodes in each of which the node is set to the "next partner", destruction and reconstruction of the routing table is carried out. Information on the reconstructed routing table is transmitted to the neighboring nodes of the node in turn, and each node that receives the data updates the routing table of the node using the data. As a result, each existing node can find the best route for all of reachable destination nodes except for the left-out node.

In the LSA, each node broadcasts data on "which are neighboring nodes of the node" to the whole network, generates a network map by itself on the basis of data broadcasted from all other nodes, and determines the shortest route to other nodes using the generated network map by itself. Each node then generates a routing table using information on the determined shortest route with respect to all destination nodes. Each node can find the best "next partner" for the node to any destination node on the basis of the generated routing table.

Further, heretofore, there has been an audio network system in which electronic music instrument, a professional audio apparatus, a personal computer and the like are connected to a network, and audio signals for multiple channels are transferred between nodes thereof. As techniques to carry out packet communication of audio signals and the like in the audio network system, there have been known "mLAN" (for example, see the following Patent Document 1 and the like) proposed by the applicant of this application, "EtherSound" (registered trademark) disclosed in the following Patent Document 2, an asymmetric transmission network system disclosed in the following Patent Document 3, and "Cobranet" (Registered Trademark) disclosed in the following Non-Patent Document 1.

[Patent Document 1] Japanese Patent Application Laid-open Publication No. 2000-278354
[Patent Document 2] U.S. Pat. No. 7,089,333
[Patent Document 3] U.S. Pat. No. 5,764,917
BIAMP Systems/Audia Digital Audio Platform document entitled "What is CobraNet"

In a technique of a conventional dynamic routing, as described above, a routing table for determining a route in accordance with an address of a destination is required to be generated and updated in each node. Thus, a very complex process is necessary in each node, whereby it causes complexity of route control in each node. Therefore, in the conventional audio network system, dynamic routing could not have been carried out with simple control. In particular, in the audio network system, since each node is a musical apparatus such as electronic music instrument, an audio amplifier and a speaker, it is desired to carry out the dynamic routing with a simple technique without complex control.

Further, in the audio network system as described above, it is known to use a reference signal called a word clock in order to synchronize with processing timing of an audio signal (sampling clock) among a plurality of nodes. As one example, it is thought that a node (at a receiving device side) that receives a packet for transmitting an audio signal generates a word clock on the basis of timing when the packet reaches, and processes the audio signal of the received packet on the basis of the generated word clock.

Now, the larger a size of a packet for transmitting an audio signal among respective nodes is, the better transfer efficiency of the audio signal becomes. However, in the case where a word clock is generated in a node that receives the packet (at the receiving device side) on the basis of timing when the packet reaches when the packet size is set so as to be larger, there has been a defect that stability of the word clock becomes lower, and lag time between the word clock of a node that transmits the packet (at a transmitting device side) and the word clock of the receiving device side becomes larger.

Further, in the audio network system as described above, one packet including sample data containing a plurality of samples about audio signals for a plurality of channels was generated in the node that transmits the audio signal (transmitting device) every predetermined period of time, and the generated packet was transmitted to the node that receives the audio signals (receiving device). Note that a transmitting cycle of the packet in the audio network system becomes longer than a sampling period of the audio signal (i.e., a period of the transmitting cycle is longer than the sampling period). Therefore, a sample of a plurality of audio signals can be contained in a single packet.

For this reason, the larger a size of a packet for transmitting audio signals among respective nodes is, the more samples can be included in the packet every transmitting cycle of the packet. Thus, transfer efficiency of audio signals becomes good. However, there has been a problem that, in the case where a transmission error of a packet occurs, the audio signal for one packet in which the transmission error occurred is lacking, and a period to output "silent" at the receiving device side is to be generated. The larger the packet is (that is, as it is laid out with the emphasis on transfer efficiency), a silent period at a transmission error becomes longer.

Further, in the conventional audio network system, any node in the network system became a management node for managing topology (network structure) of the network system. In one example of the conventional method of detecting topology, the method includes: detecting a node connected to each port of each node in the network system; informing the management node of its detection result; making up reports (detection results) received from the respective nodes in the network system by means of the management node; and detecting topology (network structure) of the network system on the basis of the result thus made up. Namely, in the conventional method of detecting topology, there has been disadvantage that complicated processes must be carried out in which each node detects other nodes connected to ports thereof and the management node is informed of its detection result. In particular, since each node in the audio network system is musical instrument such as electronic instrument, an audio amplifier and a speaker, it is preferable that detection of topology can be carried out with a simple technique without requiring complicated control.

SUMMARY OF THE INVENTION

The present invention is made in consideration of the circumstances described above, and it is an object of the present invention to provide an audio network system capable of automatically changing routes to avoid a failure (dynamic routing) with relatively simple control even when the failure occurs in the audio network system.

Further, it is another object of the present invention to provide an audio signal transmitting system in which a receiving device of packets can generate a clock signal (second clock) having little lag time between a clock (second clock) and a clock (first clock) at a transmitting device side with high stability as the clock (second clock) for synchronizing with the sampling clock among a plurality of nodes even though a size of a packet for transmitting an audio signal becomes large.

Moreover, it is still another object of the present invention to provide an audio signal transmitting system capable of avoiding occurrence of a period for outputting "silent" at a receiving device side even in the case where a transmission error of a packet occurs.

Further, it is still another object of the present invention to provide a method of detecting topology in an audio network system capable of detecting topology (network structure) of the network system with a simple technique without requiring a complicated process at each node, or an audio network system having a function to detect topology.

In order to achieve the above-mentioned objects, there is provided an audio network system including a main node having at least one port, a plurality of satellite nodes each having a plurality of ports, and a plurality of cables that connects one port of one node of the main node and the plurality of satellite nodes to one port of another node of the main node and the plurality of satellite nodes, wherein the main node includes: an input section that inputs audio signals of a plurality of channels to the main node; and a transmitting section that generates a main packet including the audio signals of the plurality of channels inputted by the input section for every predetermined period in place of the main node, and transmits the main packet via the port of the main node, and wherein each of the plurality of satellite nodes includes: a receiving section that selects one of the plurality of ports of the satellite node in turn, confirms whether the main packet arrives at the selected port every predetermined period, and, when the main packet arrives at the selected port every predetermined period, receives the main packet via the port by continuing the selection of the port; a transmitting section that transfers the main packet received by the receiving section via another port other than the selected port of the satellite node; and an output section that extracts an audio signal of a desired channel from the main packet received by the receiving section to output the extracted audio signal.

Each satellite node selects one of the plurality of ports by means of the receiving section in turn, and confirms whether or not the main packet arrives at the selected port every predetermined period. When the main packet arrives at the selected port every predetermined period, the satellite node receives the main packet via the port by continuing selection of the port. Therefore, in the case where reception of the main packet is lost at the selected port, the satellite node restarts the operation to select one of the plurality of ports in turn and to confirm whether or not the main packet arrives at the selected port every predetermined period, whereby the satellite node can automatically find another port at which the main packet arrives every predetermined period at the present stage.

Further, the present invention is an audio network system further including: another main node having one port connected to one port of one node of the plurality of satellite nodes by means of the cable, wherein the another main node includes: an input section that inputs audio signals of a plurality of channels to the another main node; a receiving section that confirms whether or not a main packet arrives at the port of the another main node every predetermined period, and, when the main packet arrives at the port, receives the main packet via the port; and a transmitting section that, when the main packet does not arrive, generates a main packet including the audio signals of the plurality of channels inputted from the input section every predetermined period in place of the main node, and transmits the main packet via the port of the another main node.

Further, the present invention is an audio network system further including: another main node having a plurality of ports, each of the plurality of ports being connected to one port of each of the plurality of satellite nodes by means of the cable, wherein the another main node includes: an input section that inputs audio signals of a plurality of channels to the another main node; a receiving section that confirms whether or not a main packet arrives at any one port of the plurality of ports of the another main node every predetermined period, and, when the main packet arrives at any one port, receives the main packet via the corresponding one port; a first transmitting section that, when the main packet arrives at the corresponding one port, transfers the main packet received by the receiving section via a port other than the corresponding one port of the another main node; and a second transmitting section that, when the main packet does not arrive at the corresponding one port, generates a main packet including the audio signals of the plurality of channels inputted from the input section every predetermined period in place of the main node, and transmits the main packet via the plurality of ports of the another main node.

The another main node confirms whether or not a main packet arrives at a port every predetermined period by means of the receiving section. When the main packet arrives at the port, the another main node receives the main packet via the port. When the main packet does not arrive, the another main node generates a main packet including audio signals of a plurality of channels inputted from the input section every predetermined period in place of the main node, and transmits the generated main packet via the port of the main node by the transmitting section. Therefore, when transfer of the main packet is lost on the audio network system, the another main node can be automatically promoted to the main node to carry out transmission of a main packet.

According to the present invention, the satellite node can automatically find another port at which the main packet arrives every predetermined period at the present stage with simple control to select one of the plurality of ports in turn and to confirm whether the main packet arrives at the selected port every predetermined period or not. Therefore, the present invention achieves a beneficial effect that, even though a failure occurs in connection between nodes in the audio network system, reception of the main packet and output of the audio signals can be continued without using a routing table.

Further, according to the present invention, when transfer of a main packet is lost on the audio network system, another main node is automatically promoted to a main node, and carries out transmission of a main packet. Therefore, the present invention achieves a beneficial effect that it is possible to continue the operation of the audio network system.

Therefore, according to the present invention, it is achieved a beneficial effect that, even though a failure occurs in the audio network system, it is possible to avoid the failure with relatively simple control by automatically changing routes (dynamic routing).

According to another aspect of the present invention, there is provided an audio signal transmitting system, including: a transmitting device; and at least one receiving device connected to the transmitting device using a cable, wherein the transmitting device includes: a clock generator that generates a first clock; a first period generator that repeatedly generates a first period on the basis of the first clock generated by the clock generator; an input section that inputs audio signals of a plurality of channels, the audio signals being synchronized with the first clock; and a transmitting section that generates a packet every first period generated by the first period generator and transmits the packet, the packet including a plurality of clock signals embedded at constant intervals each corresponding to a divisor of the first period and the audio signals of the plurality of channels inputted by the input section, and wherein the receiving device includes: a receiving section that receives the packet transmitted by the transmitting device; a clock generator that generates a second clock on the basis of timing when the receiving section receives the plurality of clock signals embedded in the packet; and an output section that extracts an audio signal of one channel from the packet received by the receiving section, and outputs the extracted audio signal in synchronization with the second clock generated by the clock generator.

The transmitting section of the transmitting device generates a packet including a plurality of clock signals embedded at every constant time interval corresponding to a divisor of the first period and an audio signal of a plurality of channels inputted by the input section every first period, and transmits it. Therefore, the receiving device can generate a second clock on the basis of reception timing (a period of every constant time interval) of each clock signal embedded every constant interval in the packet received from the transmitting device; synchronize with the generated second clock; and output the audio signal extracted from the received packet.

Further, as one preferred embodiment of the present invention, in the audio signal transmitting system, there is an empty period in which an audio signal is not contained between a packet and a subsequent packet of the packet transmitted by the transmitting device in every first period, and the receiving device can transmit data to the transmitting device during the empty period.

The receiving device can take data corresponding to the transmitting device during an empty period between a packet and a subsequent packet to transmit the data to the transmitting device.

According to the present invention, the receiving device can generate the second clock on the basis of the reception timing of the clock signal having a period (i.e., the constant time interval) shorter than the first period for transmitting the packet. Therefore, a beneficial effect that even in the case where a size of a packet for transmitting an audio signal becomes larger, the second clock having small lag time with the first clock of the transmitting device side can be generated with high stability compared with a conventional technique to generate a word clock in synchronization with timing when the packet reaches the receiving device, is achieved.

According to still another aspect of the present invention, there is provided an audio signal transmitting system, including: a transmitting device; and at least one receiving device connected to the transmitting device using a cable, wherein the transmitting device includes: an input section that inputs a sample of an audio signal every sampling period; a grouping section that groups, every predetermined period longer than the sampling period, a plurality of samples of audio signals inputted in the predetermined period by the input section into a first group of odd number samples and a second group of even number samples; a code generator that generates a first error check code based on the first group of the odd number samples and a second error check code based on the second group of the even number samples; and a transmitting section that generates and transmits a packet including the first group of the odd number samples, the first error check code, the second group of the even number samples and the second error check code every predetermined period, and wherein the receiving device includes: a receiving section that receives the packet transmitted by the transmitting device; an extracting section that extracts the first group of the odd number samples, the first error check code, the second group of the even number samples and the second error check code from the received packet; an error check section that checks, using the extracted first error check code, whether a first error occurs in the extracted first group of the odd number samples or not, and checks, using the extracted second error check code, whether a second error occurs in the extracted second group of the even number samples or not; and an output section that generates and outputs a silent audio signal in the case where a check result of the error check section is each of the first and second errors, the output section generating and outputting an audio signal on the basis of the second group of the even number samples in the case of the first error, the output section generating and outputting an audio signal on the basis of the first group of the odd number samples in the case of the second error, the output section generating and outputting an audio signal on the basis of the first group of the odd number samples and the second group of the even number samples in the case where there is no error.

The transmitting device groups, every predetermined period, the plurality of samples of audio signals inputted in the predetermined period by the input section into the first group of odd number samples and the second group of even number samples; generates the first error check code based on the first group of the odd number samples and the second error check code based on the second group of the even number samples; and generates and transmits the packet including the first group of the odd number samples, the first error check code, the second group of the even number samples and the second error check code. The receiving device extracts the first group of the odd number samples, the first error check code, the second group of the even number samples and the second error check code from the packet received from the transmitting device; and checks, using the first error check code, whether a first error occurs in the first group of the odd number samples or not, and checks, using the second error check code, whether a second error occurs in the second group of the even number samples or not. The output section of the receiving device generates and outputs the silent audio signal in the case where the check result of the error check section is each of the first and second errors, the output section generating and outputting an audio signal on the basis of the second group of the even number samples in the case of the first error, the output section generating and outputting an audio signal on the basis of the first group of the odd number samples in the case of the second error, the output section generating and outputting an audio signal on the basis of the first group of the odd number samples and the second group of the even number samples in the case where there is no error.

Further, as one preferred embodiment of the present invention, the output section of the receiving device can be constructed so as to generate the audio signal by alternately arranging the first group of the odd number samples and the second group of the even number samples one sample by one sample in the case where there is no error.

Further, as one preferred embodiment of the present invention, the output section of the receiving device can be constructed so as to generate the audio signal by generating a sample group of odd numbers on the basis of the second group of the even number samples and alternately arranging the generated sample group of the odd numbers and the second group of the even number samples one sample by one sample in the case of the first error.

Further, as one preferred embodiment of the present invention, the output section of the receiving device can be constructed so as to generate the audio signal by generating a sample group of even numbers on the basis of the first group of the odd number samples and alternately arranging the first group of the odd number samples and the generated sample group of the even numbers one sample by one sample in the case of the second error.

The output section of the receiving device generates the audio signal by alternately arranging the first group of the odd number samples and the second group of the even number samples one sample by one sample in the case where there is no error; or generates the audio signal by generating one sample group (i.e., first or second group) on the basis of the other sample group (i.e., second or first group) in which an error does not occur and alternately arranging the sample group in which an error does not occur and the generated sample group one sample by one sample in the case of the first or second error.

According to the present invention, in the case where a range of an audio signal lost by an transmission error is within any one range of the first group of the odd number samples and the second group of the even number samples even though the transmission error occurs when a packet is transmitted from the transmitting device to the receiving device, the audio signal can be generated on the basis of the group in which the error does not occur to be outputted. In such a case, a sampling frequency of the audio signal is lowered and quality thereof is degraded. However, it is much better than a situation that a period of the transmission error is to become "silent". Namely, according to the present invention, a beneficial effect that even in the case where a transmission error of a packet occurs, it is possible to avoid occurrence of a period for outputting "silent" at a receiving device.

According to still another aspect of the present invention, there is provided a method of detecting topology in an audio network system, the audio network system including: a main node having at least one port; a plurality of satellite nodes each having one M port and a plurality of S ports; and a plurality of cables, the plurality of cables including a cable to connect one port of the main node to an M port of one satellite node of the plurality of satellite nodes and a cable to connect an M port of one satellite node of the plurality of satellite nodes to an S port of another satellite node of the plurality of satellite nodes, wherein in the system, when one of the plurality of satellite nodes receives any command transmitted from the main node via the M port of the satellite node, the satellite node transfers the received command via an S port of the satellite node, and the satellite node carries out a process based on the command and transmits a response to the command via the M port of the satellite node in the case where a destination of the received command is the satellite node, wherein, when any satellite node other than the satellite node that has transmitted the response receives the response via an S port of the satellite node, the satellite node that received the response transfers the received response via the M port of the satellite node, wherein in the system, when one of the plurality of satellite nodes receives an existence confirming command for all of the satellite nodes via the M port of the satellite node, the satellite node transfers the received existence confirming command via an S port of the satellite node, and the satellite node transmits an existence confirming response to the received existence confirming command via the M port of the satellite node in the case where the satellite node is not prohibited from responding to the existence confirming command, wherein, in the case where the satellite node that has received the existence confirming response is not prohibited from transferring the existence confirming response via the S port when any satellite node other than the satellite node that has transmitted the existence confirming response receives the existence confirming response via an S port of the satellite node, the satellite node transfers the received existence confirming response via the M port of the satellite node, and wherein the method of detecting topology includes: a first step of prohibiting all S ports of all of the satellite nodes from transferring an existence confirming response; a second step of controlling the main node so as to transmit an existence confirming command via a port of the main node, and of confirming a satellite node connected to the port on the basis of an existence confirming response to the transmitted existence confirming command, the existence confirming response being returned to the main node; a third step of specifying one of the plurality of S ports of the confirmed satellite node; a fourth step of prohibiting the satellite node from transferring the existence confirming response to S ports other than the S ports on a route from the specified S port to the port of the main node, and of prohibiting the satellite nodes on the route from the specified S port to the port of the main node from responding to the existence confirming command; a fifth step of controlling the main node so as to transmit the existence confirming command via the port of the main node, and of confirming the satellite node connected to the specified S port on the basis of the existence confirming response to the transmitted existence confirming command, the existence confirming response being returned to the main node; and a sixth step of specifying, in the case where there remain S ports that have not been specified yet of the plurality of S ports of the satellite nodes that has been confirmed at the second and fifth steps, the remaining S ports one by one until all of the S ports of all of the confirmed satellite nodes are specified to repeat the fourth and fifth steps.

According to this method of detecting topology, the main node (1) prohibits all S ports of all of the satellite nodes from transferring the existence confirming response by the first step; and (2) transmits the existence confirming command via the port of the main node to confirm existence of the satellite node directly connected to the port of the main node on the basis of existence or absence of return of the existence confirming response for the main node by the second step. The main node (3) specifies one or one of the plurality of S ports of the confirmed satellite node by the third step; (4) sets the S ports other than the S port on the route from the specified S port to the port of the main node to prohibition against transfer of the existence confirming response (that is, sets only the S ports on the route from the specified S port to the port of the main node to available for transfer) and sets the satellite nodes on the route from the specified S port to the port of the main node to prohibition against response by the fourth step; and (5) transmits the existence confirming command via the port of the main node, and confirms existence of the satellite node connected to the specified S port on the basis of existence or absence of return of the existence confirming response to the main node by the fifth step. The main node then (6) specifies all S ports of the satellite node confirmed for the existence, and repeats the fourth and fifth steps until confirmation of existence of the satellite node to the destination (access point) by the sixth step.

Further, the present invention according to still another aspect of, there is provided a method of detecting spare wire for connecting two S ports of two satellite nodes in the audio network system after executing the method of detecting topology as described above, wherein in the system, when one of a plurality of satellite nodes receives a connection confirming command to the satellite node via the M port of the satellite node, the satellite node transmits a search signal via an S port specified by a port designator, the connection confirming command including the port designator designating one S port of the satellite node, wherein, when any satellite node other than the satellite node that has transmitted the search signal receives the search signal via an S port of the satellite node, the satellite node that received the search signal transmits a connection confirming response via the M port of the satellite node, the connection confirming response including a node ID of the satellite node and a port specifier indicating the S port via which the satellite node has received the search signal, wherein, when any satellite node receives the connection confirming response via an S port of the satellite node, the satellite node that has received the connection confirming response transfers the received connection confirming response via the M port of the satellite node, and wherein the method of detecting the spare wire includes: a seventh step of specifying one of particular S ports among a plurality of S ports of the confirmed satellite node, each of said particular S ports being a port via which said existence confirming response is not returned to the main node at the fifth step; an eighth step of controlling the main node so as to transmit the connection confirming command including the port designator designating the specified S port to the satellite node having the specified S port via a port of the main node, and of confirming the satellite node connected to the specified S port on the basis of the connection confirming response to the transmitted connection confirming command, the connection confirming response being returned to the main node; and a ninth step of specifying remaining S ports one by one to repeat the eighth step in the case where there remain, in the specific S ports, the S ports via which the existence confirming response has not been returned to the main node at the fifth step or the S ports that have not been specified yet of the S ports via which the search signal corresponding to the connection confirming command transmitted at the eighth step has not been received.

According to this method of detecting spare wire, the main node (7) specifies the S port for which spare wire is confirmed by the seventh step; and (8) transmits the connection confirming command to the satellite node having the specified S port, and confirms existence of the satellite node connected to the specified S port by the spare wire on the basis of existence or absence of the connection confirming response to the main node by the eighth step. The main node then (9) repeats the eighth step until all S port required for detection of the spare wire are checked by the ninth step.

Further, According to still another aspect of the present invention, there is provided an audio network system, including: a main node having at least one port; a plurality of satellite nodes each having one M port and a plurality of S ports; and a plurality of cables, the plurality of cables including a cable to connect one port of the main node to an M port of one satellite node of the plurality of satellite nodes and a cable to connect an M port of one satellite node of the plurality of satellite nodes to an S port of another satellite node of the plurality of satellite nodes, wherein in the system, each of the plurality of satellite nodes includes: a command transferring and response transmitting section that transfers, when to receive any command transmitted from the main node via the M port, the received command via an S port of the satellite node, the command transferring and response transmitting section carrying out a process based on the command and transmitting a response of the satellite node to the received command via the M port in the case where a destination of the received command is the satellite node; a response transferring section that transfers, when to receive the response transmitted by a command transferring and response transmitting section of other satellite node via the S port, the received response made by the other satellite node via the M port of the satellite node; a transfer prohibiting section that prohibits, when to receive a transfer prohibiting command from the main node via the M port, a transfer by the response transferring section of the response made by the other satellite node, the response being received via the S port specified by the transfer prohibiting command, the transfer prohibiting section permitting the transfer of only S ports other than the specified S port; and a response prohibiting section that prohibits, when to receive a response prohibiting command for prohibiting a response to an existence confirming command from the main node via the M port, the command transferring and response transmitting section from transmitting an existence confirming response made against the existence confirming command by the satellite node, wherein for carrying out detection of topology in the audio network system, the main node includes: a first transmitting section that transmits the transfer prohibiting command for prohibiting all of the satellite nodes from transferring the existence confirming response from all of S ports via a port of the main node to prohibit all of the satellite nodes from transferring the existence confirming response from all of the S ports; a first confirming section that transmits the existence confirming command via the port of the main node after the transfer prohibiting command has been transmitted by the first transmitting section, and confirms the satellite node connected to the port of the main node on the basis of the existence confirming response to the transmitted existence confirming command, the existence confirming response being returned to the main node; a first specifying section that specifies one of the plurality of S ports that the confirmed satellite node has; a second transmitting section that transmits, via the port, the transfer prohibiting command for prohibiting S ports, other than the S ports on a route from the S port specified by the first specifying section to the port of the main node, from transferring the existence confirming response, and transmits, via the port, the response prohibiting command for prohibiting the satellite nodes on the route from the specified S port to the port of the main node from carrying out the existence confirming response to the existence confirming command; a second confirming section that transmits the existence confirming command via the port after the transfer prohibiting command and the response prohibiting command have been transmitted by the second transmitting section, and confirms the satellite node connected to the specified S port on the basis of the existence confirming response to the transmitted existence confirming command, the existence confirming response being returned to the main node; and a determining section that specifies, in the case where there remain S ports that have not been specified yet of the plurality of S ports of the satellite nodes confirmed by the first and second confirming sections, the remaining S ports one by one until all of the S ports of all of the confirmed satellite nodes are specified to repeatedly confirm the satellite node connected to the S port specified by the second transmitting section and the second confirming section.

Further, According to still another aspect of the present invention, there is provided the audio network system described above wherein each of the plurality of satellite nodes further includes: a search signal transmitting section that transmits, when to receive a connection confirming command for the satellite node via the M port, a search signal via one S port designated by a port designator, the connection confirming command including the port designator designating the S port of the satellite node; a connection confirming response transmitting section that transmits, via the M port, a connection confirming response including a node ID of the satellite node and a port specifier specifying the S port via which the satellite node receives the search signal when a search signal transmitted by a search signal transmitting section of other satellite node is received via an S port; and a connection confirming response transferring section that transfers the received connection confirming response via the M port when a connection confirming response transmitted by a connection confirming response transmitting section of other satellite node is received via an S port, and wherein for detecting spare wire to connect two S ports of two satellite nodes in the audio network system after detecting the topology, the main node further includes: a second specifying section that specifies one of the specific S ports of the plurality of S ports of the confirmed satellite node, the existence confirming response being not returned from the specific S ports in the second confirming section; a third confirming section that transmits, via the port of the main node, the connection confirming command including the port designator designating the specified S port to the satellite node having the S port specified by the second specifying section, and confirms the satellite node connected to the specified S port on the basis of the connection confirming response to the transmitted connection confirming command, the connection confirming response being returned to the main node; and a second determining section that specifies remaining S ports one by one to repeatedly confirm the satellite node connected to the S port specified by the third confirming section in the case where there remain, in the specific S ports, the S ports via which the existence confirming response has not been returned to the main node in the second confirming section or the S ports that have not been specified yet of the S ports via which the search signal corresponding to the connection confirming command transmitted in the third confirming section has not been received.

Namely, the present invention can construct and implement the audio network system having a function to detect topology, and further the audio network system having a function to detect spare wire.

According to the present invention, using simple communication protocols, such as transmission of the "existence confirming command" by the main node, return of the "existence confirming response" by the satellite node that received the "existence confirming command", remote control to "prohibit transfer" for S ports of satellite nodes, and remote control to "prohibit response" for each of the satellite nodes, the main node can detect connection (topology) of all of the satellite nodes on the network. In this case, each of the satellite nodes is merely required to carry out simple processes such as a response to the "existence confirming command" (existence confirming response) and reception of remote control to prohibit transfer for each of the S ports. Thus, it is no need for the satellite node to carry out complicated processes such as a process to detect a neighboring node by oneself. Therefore, a beneficial effect that topology (network structure) of the network system can be detected with a simple technique without need to carry out a complicated process at each node is achieved. The method of detecting topology according to there is provided not suitable for detection of topology that the system uses to control the nodes, but for detection of topology that the system presents its users (for example, topology presented by display on a screen or the like).

Further, according to the present invention, by simple communication protocols including transmission of the "connection confirming command" by the main node, transmission of the "search signal" by the satellite node that received the "connection confirming command", and return of the "connection confirming response" by the satellite node that received the search signal, the main node can detect spare wire of the satellite nodes. In this case, the satellite node is merely required to carry out simple processes (transmission of the "search signal" according to the "connection confirming command", and transmission of the "connection confirming response" according to the "search signal"), and is not required to carry out complicated processes such as detection of the neighboring nodes. Therefore, a beneficial effect that spare wire of the network system can be detected with a simple technique without need to carry out a complicated process at each node is achieved.

The foregoing and other objects, features and advantages of the present invention will become more readily apparent from the following detailed description of a preferred embodiment of the present invention that proceeds with reference to the appending drawings.

BRIEF DESCRIPTION OF DRAWINGS

FIGS. 4A-4D are views for explaining procedures to generate a main packet of FIG. 3.

FIG. 6 is a block diagram showing a detailed configuration of an oscillator in the satellite node of FIG. 5.

FIG. 11 is a flowchart showing an example of an M port setting process in the satellite node.

FIG. 12 is a flowchart showing an example of an M port setting process in the main node.

FIGS. 16A-16H are views for explaining network structure data.

DETAILED DESCRIPTION OF THE INVENTION

Embodiments of the present invention will now be described in detail with reference to the accompanying drawings.

<Configuration of Audio Network System>

Figure 1:
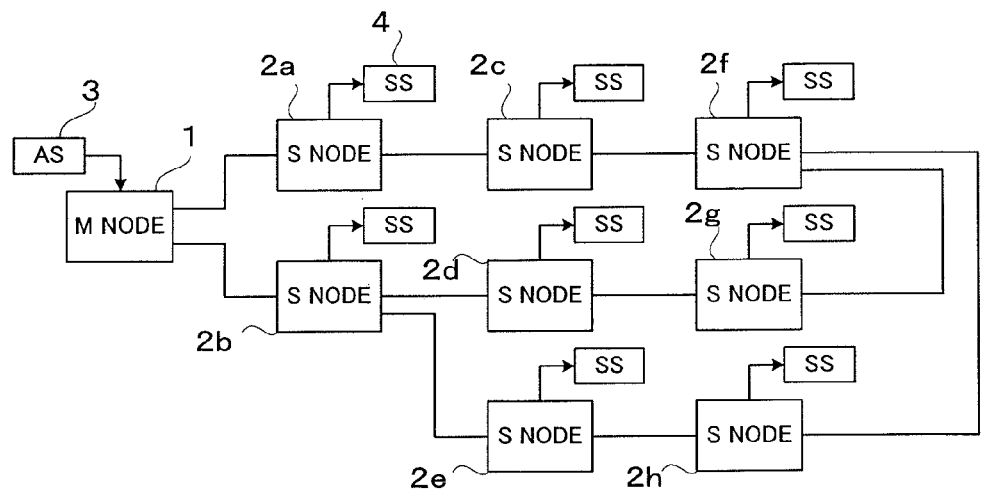
FIG. 1 is a block diagram for explaining a configuration example of an audio network system according to the present invention.

FIG. 1 is a schematic block diagram showing an example of a whole configuration of an audio network system according to the present invention. An audio network system is constructed from: one main node (M node) 1 having at least one port; a plurality (eight in FIG. 1) of satellite nodes (S nodes) 2a to 2h each having a plurality of ports; and a plurality of cables (connecting wire) each of which connects one port of an arbitrary node of the main node 1 and the plurality of satellite nodes 2a to 2h to one port of another arbitrary node of the main node 1 and the plurality of satellite nodes 2a to 2h. In the configuration example of the audio network system in FIG. 1, each of the satellite nodes 2a to 2h is connected to other node or nodes through one or more port thereof. Therefore, there is one or more route from the main node 1 to each of the satellite nodes 2a to 2h for every satellite node 2a to 2h.

An audio source (AS) 3 that supplies audio signals of a plurality of channels (for example, eight channels) to the main node 1 is connected to the main node 1. The main node 1 is a node that transmits a main packet including the supplied audio signals. It is assumed that the main node 1 is a musical apparatus having a network function, such as an amplifier and an audio mixer, or a general-purpose computer, for example.

Further, a sound system (SS) 4 for reproducing sounds in accordance with an audio signal is connected to each of the satellite nodes 2a to 2h. The sound system (SS) 4 reproduces sounds in accordance with an audio signal included (or contained) in the main packet that is received from the main node 1. In this embodiment, it is assumed that each of the satellite nodes 2a to 2h (including sound system (SS) 4) is a speaker apparatus in which an amplifier is provided.

The main node 1 generates packet data including the audio signals of the plurality of channels supplied from the audio source 3 every predetermined period, and transmits the generated packet data from a port with which the main node 1 is provided. The main packet transmitted from the main node 1 every predetermined period is transferred between nodes connected to each other on the audio network system. Each of the satellite nodes 2a to 2h receives the main packet via any one of the plurality of ports thereof, and extracts an audio signal of a channel necessary for itself from the received main packet. Each of the satellite nodes 2a to 2h then outputs the extracted audio signal to the corresponding sound system 4, and transfers the received main packet to other satellite nodes via other ports than the port from which the main packet is received. Therefore, so long as any one route for each of the satellite nodes 2a to 2h is connected to the main node 1, the satellite nodes 2a to 2h can receive the audio signals transmitted from the main node 1.

A route to transmit packet data from the main node 1 to each of the satellite nodes 2a to 2h is selected by route control (routing), which will be described later in detail. The audio network system shown in this embodiment has a feature in the route control. To make a further reference, the feature is that, in the case where a failure occurs in the route for transmitting the packet data (for example, in the case where any node falls out, or the like), by searching a new route in routes in which cables are arbitrarily connected (searching another route) to automatically change routes, it is possible to avoid the failure (that is, to carry out dynamic routing) with relatively simple control.

Figure 2:
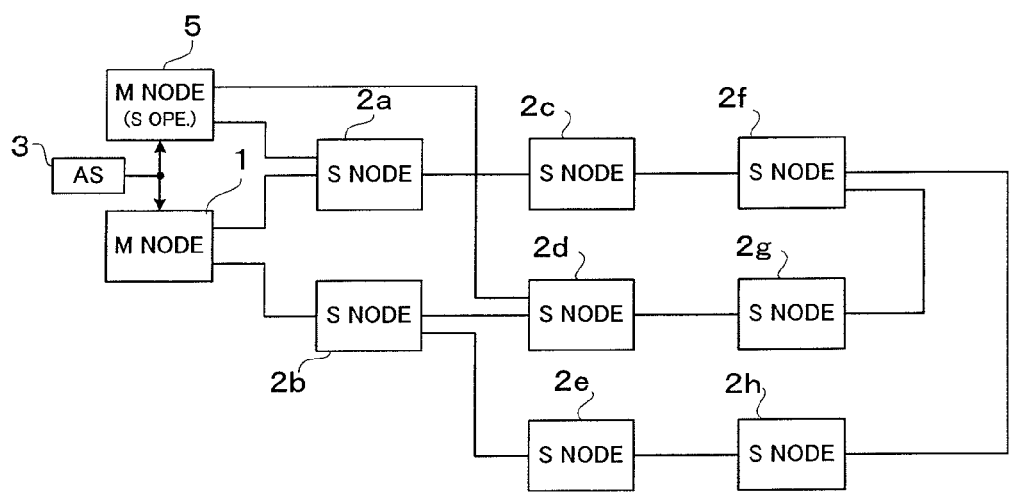
FIG. 2 is a block diagram showing another configuration example of the audio network system in FIG. 1.

FIG. 2 is a modified example of the configuration of the audio network system shown in FIG. 1. FIG. 2 shows a configuration example in which one main node 5 is further added to the audio network system in FIG. 1, that is, a configuration example in which main nodes are duplexed (doubled). In FIG. 2, two main nodes 1 and 5 are respectively connected to the audio network system, and an audio source 3 is connected to both the main node 1 and the main node 5.

As shown in FIG. 2, in the configuration having a plurality (two or more) of main nodes (the configuration in which main nodes are multipexed), one of a plurality (two or more) of main nodes (for example, main node 1) operates as a main node, and the other main nodes (for example, main node 5) operate as a satellite node. Namely, the main node 5 that operates as a satellite node receives a main packet via any port, and transfers the received main packet to other satellite nodes via other ports. Then, in the case where the main node 5 that operates as a satellite node does not receive a main packet via any port (in the case where the main node 1 disappears from the audio network system), the main node 5 is automatically promoted to a main node, and starts operations as a main node. In this regard, illustration of a sound system connected to each of the satellite nodes is omitted in FIG. 2.
<Structure of Packet>

Figure 3:
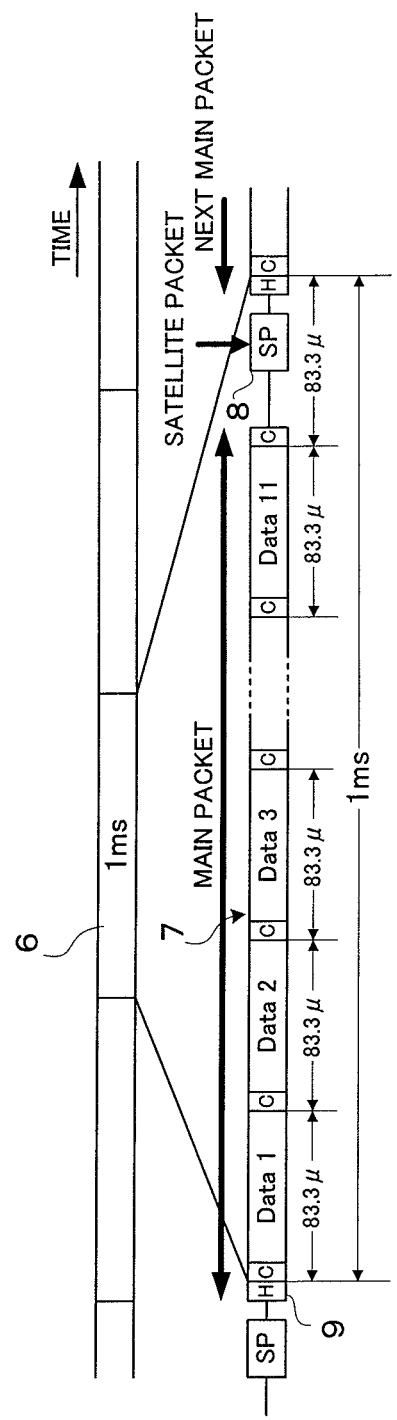
FIG. 3 is a view for explaining a structure of a packet to be transmitted in the audio network system in FIG. 1.

FIG. 3 is a view for explaining a structure of packet data flowing on the audio network system. In FIG. 3, a horizontal axis indicates time, and one frame 6 on the time axis indicates a period (namely, a cycle) of one milliseconds (one msec.), which is a unit of packet transfer, i.e., a packet transmitting cycle. A main packet 7 and a satellite packet 8 are transferred for every packet transmitting cycle (one msec.). A transfer rate of data in this network system is 24.576 Mbit/sec., for example. The main packet 7 has a header in the lead, a plurality of clock signals and plural kinds of data after the header. The plurality of clock signals and the plural kinds of data are reciprocally provided therein. The main node 1 generates one main packet 7 every packet transmitting cycle, and transmits the main packet 7 from all ports of the main node 1 toward the satellite nodes. The satellite packet 8 is a packet to be generated and transmitted by the satellite nodes if necessary. The satellite packet 8 does not always come in every packet transmitting cycle.

The plurality of clock signals are included (or contained) in one packet. The clock signal is a clock signal for synchronizing a sampling clock of the satellite nodes 2a to 2h side with a sampling clock of the main node 1 side.

In this embodiment, the clock signals are included (or contained) every 83.3 μsec. in which the packet transmitting cycle (one msec.) is equally divided into twelve. Namely, twelve clock signals are embedded in one packet at even intervals. Data of 2048 bits (256 bites) including the clock signal are transferred every period of 83.3 μsec. Eleven pieces of data (Data 1 to Data 11) constituting the main packet 7 are included (or contained) in the lead to eleventh periods of the periods of 83.3 μsec. in which the packet transmitting cycle (one msec.) is equally divided into twelve, and the satellite packet 8 is included in the last twelfth period. In this specification, a period (from the lead to the eleventh period of one packet) for transferring the main packet 7 is referred to as a "main packet period", while the last twelfth period is referred to as a "satellite packet period".

In this regard, in FIG. 3, the satellite packet 8 in the "satellite packet period" is delayed with respect to the clock signal indicating timing to start the satellite packet period (the packet is drawn so as to be spaced against the clock signal). The satellite node that generates the satellite packet 8 outputs the satellite packet 8 at the timing of the clock signal in the satellite packet period. However, a relation between transfer delay at each connecting wire on the route to the main node and time taken for transfer of the satellite packet at each node causes the satellite packet 8 to delay with respect to the clock signal more toward an upstream side. In FIG. 3, such delay is expressed.

Further, a header of a next main packet 7 is provided at the end of the satellite packet period (that is, the end of the packet transmitting cycle). Namely, a header of a main packet 7 is provided in the end of the last packet transmitting cycle. In this regard, a header portion 9 is a bit pattern indicating the lead of a packet.

FIG. 4 is a view for explaining an overview of procedures to generate one main packet 7. In this embodiment, a bit width of an audio signal is set to 24 bits, and a sampling rate thereof is set to 96 kHz. The packet transmitting cycle of one msec. described above corresponds to time obtained by dividing the sampling clock into 96 pieces. Therefore, 96 pieces of sample data ("S0" to "S95") of 96 sampling periods are included (or contained) in the main packet 7 generated every packet transmitting cycle. Each piece of the sample data ("S0" to "S95") is a sample of audio signals of eight channels.

In FIG. 4A, the 96 pieces of sample data ("S0" to "S95") are grouped into a group of even samples ("S0", "S2" . . . "S94") and a group of odd samples ("S1", "S3", . . . "S95"). In FIG. 4B, a set of the group of even samples ("S0", "S2", . . . "S94") and a control signal (CTR) and a set of the group of odd samples ("S1", "S3", . . . "S95") and a control signal (CTR) are generated, and error check information (EC) is added to each set. The control signal (CTR) includes commands for the satellite nodes regarding route control and the like, and control data for remotely controlling signal processing of the respective satellite nodes from the main node 1. The error check information (EC) is information for checking an error in each of an even sample group (even number sample group) and an odd sample group (odd number sample group) when the audio signal of each channel is reproduced at each of the satellite nodes 2a to 2h that received the packet.

Thus, by dividing (grouping) the data constituting one main packet into two groups including the data in which the error check information is added to the set of the even sample group and the control signal and the data in which the error check information is added to the set of the odd sample group and the control signal, the audio signal can be reproduced using the data of a group of the two groups, which is unaffected by a transmission error of a packet when the audio signal is reproduced at any satellite node even in the case where part of the data in the packet has been lost by means of the transmission error of the packet.

Twelve clock signals are embedded in one main packet, which are constructed from the data in which the error check information is added to the set of the even sample group and the control signal and the data in which the error check information is added to the set of the odd sample group and the control signal, at even intervals.

Namely, the data of one main packet (the data in which the error check information is added to the set of the even sample group and the control signal and the data in which the error check information is added to the set of the odd sample group and the control signal) are equally divided into 11 pieces of data block "Data 1" to "Data 11" (FIG. 4C), each of the data blocks "Data 1" to "Data 11" is put between any two of the 12 clock signals, and the header portion 9 is added to the load portion of the main packet (FIG. 4D). Thus, a main packet 7 in which 12 clock signals are embedded in a period of a packet transmitting cycle (one msec.) at even intervals is generated. In this case, a size of the main packet 7 is in the range of about 2,820 to 2,830 bytes.

As this embodiment, by separately embedding a plurality of clock signals (12 signals) in a main packet 7 to be transferred every predetermined period (one msec.) at even intervals (83.3 μsec.), in each of the satellite nodes, it is possible to generate a sampling clock used for reproduction of the audio signal in one packet transmitted every one msec. on the basis of a plurality of clock signals every 83.3 μsec. Therefore, compared with the case where a sampling clock is generated with rough resolution synchronized with the transmitting cycle of a main packet 7, it is possible to generate a sampling clock (a sampling clock at the satellite node side) with high stability and with a small shift against a sampling clock used at the main node that generates the main packet 7.

<Hardware Configuration>

Figure 5A:
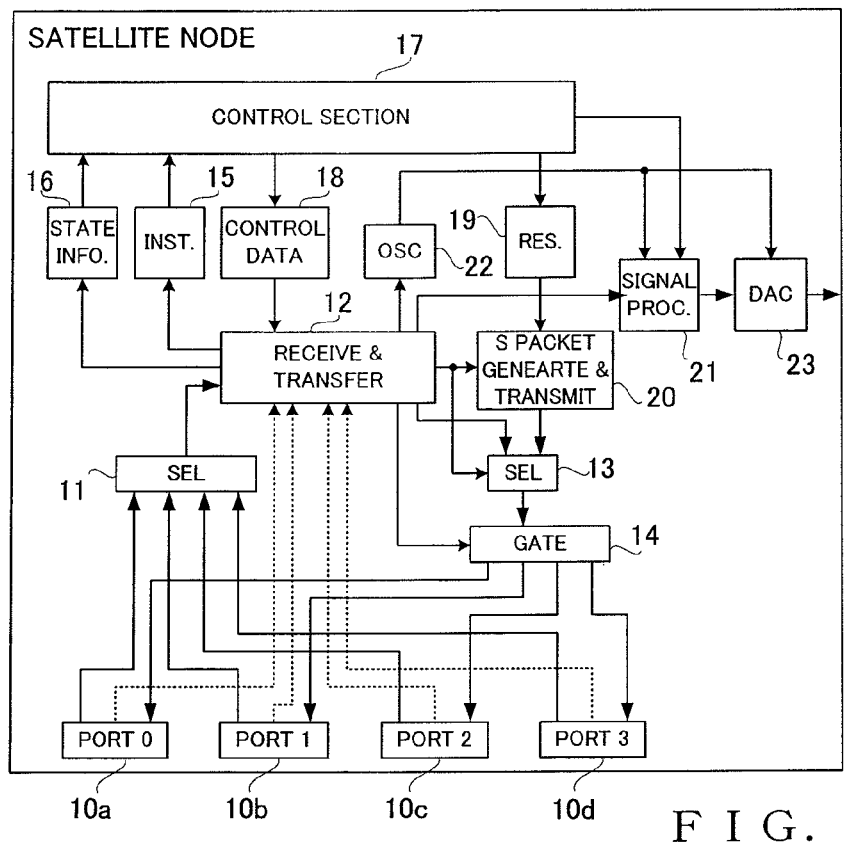
FIG. 5A is a block diagram showing an example of a hardware configuration of a satellite node.
Figure 5B:
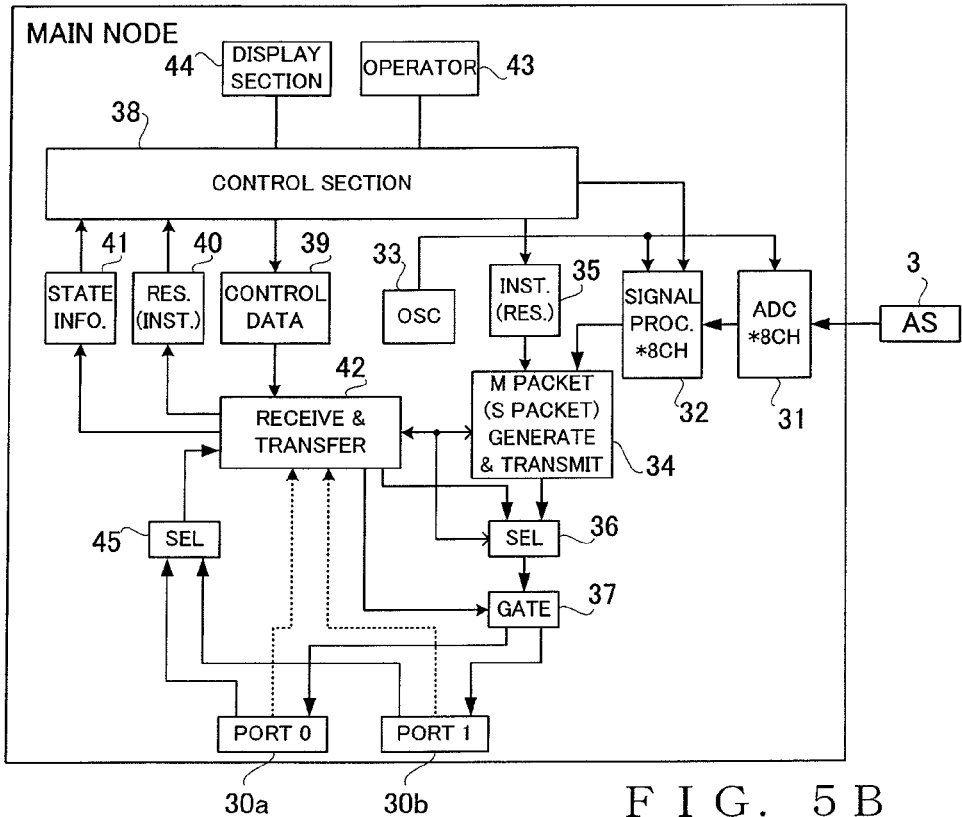
FIG. 5B is a block diagram showing an example of a hardware configuration of a main node.

FIG. 5 is a block diagram for schematically explaining a hardware configuration of each of the satellite nodes 2a to 2h and the main node 1. FIG. 5A is a configuration example of the satellite node, while FIG. 5B is a configuration example of the main node.

<Satellite Node>

In FIG. 5A, a satellite node includes four ports 10a to 10d. Numerical values increasing one by one from "0" are applied to the four ports 10a to 10d as port numbers ("port 0", "port 1", "port 2" and "port 3"). Any one of the four ports 10a to 10d ("port 0" to "port 3") becomes a main port (M port) that receives a main packet transmitted from a main node 1.

In a main packet period of a packet transmitting cycle (one msec.), a first selector 11 selects the M port from the four ports 10a to 10d, and outputs the received main packet to a receiving and transferring section 12 every packet transmitting cycle. In a satellite packet period, the first selector 11 selects one port, via which a satellite packet is received, from the three ports (S ports) other than the M port, and outputs the received satellite packet to the receiving and transferring section 12. Further, a reception detecting signal conveying that packet data is started to receive at the port is outputted to the receiving and transferring section 12 from each of the ports 10a to 10d (indicated by a dotted line in FIG. 5A). The receiving and transferring section 12 controls the first selector 11 so as to select a port via which the satellite packet is first received for each of the satellite packet periods on the basis of the reception detecting signal (one that arrives first has a priority).

In this regard, the "M port" means a port that receives the main packet in the satellite node (that is, a port that faces the main node when the network structure is hierarchically viewed along a packet transmission route). Further, the "S port" specifies ports of the four ports other than the M port.

The receiving and transferring section 12 carries out control to receive the main packet and the satellite packet supplied from the first selector 11 on the basis of control data stored in a control data register 18 (will be described later), control to extract various data from the received packet, and control to transfer the received packet to other node. Further, in the case where the satellite node generates and transmits a satellite packet, the receiving and transferring section 12 also carries out an operation to control transmission timing of the satellite packet. The satellite node basically generates the satellite packet including a response to the control signal and transmits the satellite packet to the main node when the satellite node is a destination in a control signal (CTR) included in the received main packet. Details of each operation will be described later.

The main packet or the satellite packet to be transferred, which is outputted from the receiving and transferring section 12, is inputted to a second selector 13 via one input, and the satellite packet outputted from a satellite packet generating and transmitting section 20 is inputted via the other input. An output of the receiving and transferring section 12 is basically selected to output. When transmission of the satellite packet is set by a control section 17, output of the satellite packet generating and transmitting section 20 is selected at the timing of a clock signal indicating the lead of a satellite packet period supplied from the receiving and transferring section 12. In this regard, the present system is designed so that a plurality of satellite nodes do not generate and transmit satellite packets at the same time, and therefore, no satellite packet to be transferred is sent from a downstream side of the route when a satellite packet is transmitted from the satellite node. On the other hand, when a satellite packet to be transferred from the downstream side of the route is transmitted, there is no need to transmit a satellite packet from the satellite node.

A gate 14 is a gate for controlling opening and closing of each of the four ports 10a to 10d ("port 0" to "port 3"). The gate 14 opens all of the ports other than the M port in the main packet period, and opens only the specified M port in the satellite packet period. Therefore, the main packet is transferred to all of the satellite nodes that are connected to the downstream side of the route of the satellite node, and the satellite packet is transferred (transmitted) to only the specified M port.

An instruction register 15 is a register for writing various kinds of instruction data (control signal CTR) extracted from the received main packet by means of the receiving and transferring section 12 thereinto. A state information register 16 is a register for writing various kinds of state information such as confirmation of reception of the main packet thereinto.

Reception and transfer of the packet data (main packet and satellite packet) via the ports 10a to 10d are controlled by the operations of the first selector 11, the receiving and transferring section 12, the second selector 13 and the gate 14 as described above.

The control section 17 is a microcomputer including a CPU and a memory. By executing various processes (will be described later in detail), the control section 17 generates control data for controlling the receiving and transferring section 12, generates (or creates or reconstructs) response data to various commands written into the instruction register 15, or generates values of various kinds of control parameters used for signal processing of the signal processing section 21.

The control data register 18 is a register for holding the control data for controlling the receiving and transferring section 12, which are generated by the control section 17. M port number data indicating the M port of the satellite node, reception channel number data indicating a channel number necessary for the satellite node in the audio signals of eight channels, and prohibited port data for instructing whether transfer of the received satellite packet is permitted or prohibited for each port of the four ports 10*a* to 10*d* ("port 0" to "port 3") are included in the control data.

A response register 19 is a register for writing response data generated by the control section 17 with respect to the command transmitted from the main node thereinto. Since the response data always address to the main node, data indicating a destination is not added to the written response data. When the response data are set to the response register 19 by the control section 17, the satellite packet generating and transmitting section (S packet generating and transmitting section) 20 generates a satellite packet on the basis of the response data, and transmits the generated satellite packet at the timing of a clock signal indicating the lead of the satellite packet period supplied from the receiving and transferring section 12. An output of the satellite packet generating and transmitting section 20 becomes one input of the second selector 13.

Further, the receiving and transferring section 12 buffers data of the received main packet ("Data 1" to "Data 11") every packet transmitting cycle (every one msec.), extracts an audio signal of the channel necessary for the satellite node from the buffered data on the basis of the reception channel number data stored in the control data register 18, and carries out control to output the extracted audio signal to the signal processing section 21 every sampling period (a process related to reproduction of an audio signal). At this time, the receiving and transferring section 12 detects reception timing of a plurality of clock signals embedded in the main packet at even intervals, and transmits it to the oscillator 22.

The oscillator (OSC) 22 synchronizes with the reception timing of the clock signal in the main packet, and generates a sampling clock (second clock) that is a signal for defining a sampling period. FIG. 6 is a view showing a configuration example of the oscillator. The OSC 22 is constructed from: a phase comparator 50 that compares a phase of a feedback signal with reception timing of the clock signal of the main packet; a frequency information generator 51 that generates frequency information corrected in accordance with an output of the phase comparator 50; an oscillator 52 whose oscillation frequency is controlled by an output signal of the frequency information generator 51; and a divider 53 put between an output of the oscillator 52 and an input of the phase comparator 50. Namely, an operation clock generator is a frequency multiplier by means of a PLL (abbreviation for "Phase Locked Loop"). The operation clock generator compares reception timing of the clock signal of the main packet with rising (or trailing) timing of the feedback signal, and adjusts frequency information so that a phase of a signal in which the clock signal from the receiving and transferring section 12 and the output of the oscillator 52 are divided into eight in accordance with the comparison result keeps a given relation to output the frequency information to the oscillator 52. The oscillator 52 generates a sampling clock (96 kHz) synchronized with the clock signal in accordance with the frequency information to output the sampling clock. The clock signal of the main packet is a clock of timing in which one transfer clock (one transmitting cycle=one msec.) is divided into twelve, but corresponds to a signal in which the sampling clock (96 kHz) of the main node is divided into eight. By dividing the sampling clock of the satellite node into eight to synchronize it with the phase of the clock signal of the main packet, as a result, the sampling clock generated in the satellite node is synchronized with the sampling clock of the main node.

The signal processing section 21 is constructed from a filter, a compressor, a delay (delay control), or an element such as a level control (damper). The signal processing section 21 carries out signal processing for a sample of the audio signal outputted from the receiving and transferring section 12 every sampling period indicated by the sampling clock outputted by the oscillator 22 to output the sample to a digital-to-analog converter (DAC) 23. A value of a parameter used for the signal processing of the signal processing section 21 is supplied from the control section 17. The DAC 23 converts the samples of the audio signals for a plurality of channels, which are outputted from the signal processing section 21, into analog signals every sampling period indicated by the sampling clock outputted by the oscillator 22, and outputs the analog signals to the sound system 4 (see FIG. 1).

<Main Node>

A configuration of the main node will be described with reference to FIG. 5B. The main node includes two ports ("port 0" 30*a* and "port 1" 30*b*). Main operation of the main node is to generate a main packet including the audio signals supplied from the audio source (Reference numeral 3 in FIG. 1) and to transmit it from the ports 30*a*, 30*b*.

An analog-to-digital converter (ADC) 31 converts analog audio signals of eight channels inputted from an external audio source (Reference numeral 3 in FIG. 1) into digital signals every sampling period indicated by the sampling clock (96 kHz) to output digital signals to a signal processing section 32. The signal processing section 32 processes the audio signals of the eight channels supplied from the ADC 31 on the basis of the value of the parameter supplied from a control section 38 every sampling period (96 kHz) for each channel, and outputs the audio signals to a main packet generating and transmitting section 34. An oscillator (OSC) 33 generates a sampling clock (first clock) of a predetermined sampling frequency (for example, 96 kHz) on the basis of a system clock (not shown in the drawings), and supplies the sampling clock to the ADC 31 and the signal processing section 32.

In this regard, although an example in which an input interface of the audio signal is configured by the ADC 31 into which the analog signals are inputted has been described in this embodiment, an input interface of a digital signal into which a digital audio signal is inputted may be utilized. In a configuration to input a digital signal, an external sampling clock extracted from the digital signal or an external sampling clock separately supplied from a source of the digital signal may be supplied to the OSC 33, the OSC 33 may be caused to generate a sampling clock synchronized with the supplied external sampling clock.

The main packet generating and transmitting section 34 generates a main packet including the audio signals of the eight channels supplied from the signal processing section 32 and various kinds of instruction data (control signal CTR) supplied from an instruction register 35 at the timing to transmit the main packet (packet transmitting cycle of every one msec.), and outputs the generated main packet to a first selector 36. Further, the main packet generating and transmitting section 34 outputs the clock signal indicating the lead of the satellite packet period at the timing of the clock signal of the end of the main packet to a receiving and transferring section 42. Further, the main packet generating and transmitting section 34 generates clock signals for embedding into the main packet to be generated by the main packet generating and transmitting section 34 on the basis of the system clock (not showing in the drawings) every 83.3 s, and counts up the generated clock signals to generate a pulse signal indicating a packet transmitting cycle whenever 12 pieces of the clock signals are counted up, thereby repeatedly generating the packet transmitting cycles every one msec. Here, since both the main packet generating and transmitting section 34 and the OSC 33 are synchronized with the same system clock (not shown in the drawings), the packet transmitting cycle generated by the main packet generating and transmitting section 34 corresponds to time obtained by dividing the sampling clock generated by the OSC 33 into 96 pieces. Namely, the main packet generating and transmitting section 34 repeatedly generates the packet transmitting cycle (namely, a first period) every time obtained by dividing the sampling clock (namely, the first clock) generated by the OSC 33 into 96 pieces.

An output of the main packet generating and transmitting section 34 and an output of the receiving and transferring section 42 are inputted to the first selector 36. When the main node operates as a main node, the first selector 36 selects the output of the main packet generating and transmitting section 34 to output it to a gate 37. When the main node operates as a main node, the gate 37 opens the two ports 30a, 30b. Therefore, when the main packet generating and transmitting section 34 generates and transmits the main packet at the timing to transmit the main packet, the main packet is transmitted from the two ports 30a, 30b.

The control section 38 is a microcomputer including a CPU and a memory, and executes various processes (will be described in detail later). More specifically, the control section 38 generates values of various kinds of control parameters used for signal processing of the signal processing section 32 in accordance with an operation of an operator 43 to supply the values to the signal processing section 32, generates various instructions (including parameters for remote control) for the satellite nodes to write them into the instruction register 35, or generates control data to control the receiving and transferring section 42 to write them into a control data register 39. Further, the control section 38 of the main node has a memory for storing data indicating a network structure (will be described later).

The instruction register 35 is a register for writing various kinds of instruction data generated by the control section 38 for the satellite nodes thereinto. An ID (Identifier) indicating a destination of the command is added to written instruction data. The control data register 39 is a register for writing control data generated by the control section 38 to control the receiving and transferring section 42 thereinto. Further, a response register 40 is a register for writing various kinds of response data included (or contained) in the satellite packet received by the receiving and transferring section 42 thereinto. Further, a state information register 41 is a register for writing various kinds of state information such as confirmation of packet reception in the receiving and transferring section 42 thereinto.

The operator 43 is used to change a value of a parameter to control an operation (signal processing) of the main node itself, to change a value of a parameter to remotely control an operation (signal processing) of the satellite nodes, or to instruct switching of a screen on the display section 44. When the operator 43 is operated, the operation and/or operation amount is detected, and data indicating the operated operator and data indicating the detected operation and/or operation amount are supplied to the control section 38. The display section 44 is a display for displaying various kinds of information on the basis of control of the control section 38. A setting state of a desired parameter of the main node and/or other node and a network structure of the audio network system to which the main node is connected are displayed on the display section 44.

The receiving and transferring section 42 operates on the basis of various kinds of control data set in the control data register 39. When the satellite packet transmitted by the satellite node is received, the receiving and transferring section 42 extracts response data from the satellite packet to write them into the response register 40, or to write various data such as confirmation of the packet reception into the state information register 41. In this regard, when the main node operates as a main node, transfer of a packet is carried out. A second selector 45 is connected to the two ports 30a, 30b in accordance with an instruction from the receiving and transferring section 42, selects any one output of the ports 30a, 30b, and outputs the fact to the receiving and transferring section 42. When the main node operates as a main node, the main node is controlled to select an output of the port, which first receives a satellite packet in each satellite packet period, of the ports 30a, 30b.

When a plurality of main nodes exist on the audio network system as shown in FIG. 2, only one main node operates as a main node, and the others operate as a satellite node. In the case where the main node operates as a satellite node, each portion of the main node shown in FIG. 5B operates in the same manner as each portion corresponding to the satellite node shown in FIG. 5A. In the case where the main node operates as a satellite node, in FIG. 5B, the response register 40 becomes an "instruction register" to hold various kinds of instruction data extracted from the received main packet, and the instruction register 35 becomes a "response register" to hold various kinds of response data against the instruction data. The main packet generating and transmitting section 34 becomes a "satellite packet generating and transmitting section (S packet generating and transmitting section)" to generate and transmit a satellite packet including the response data of the "response register" (the instruction register 35) under control of the control section 38. The second selector 45 then selects an output of an M port of the ports 30a and 30b for the main packet period, and selects an output of an S port for the satellite packet period. Further, the first selector 36 basically selects an output of the receiving and transferring section 42. When a satellite packet should be transmitted from the first selector 36 itself, the first selector 36 selects the output of the "satellite packet generating and transmitting section" (main packet generating and transmitting section 34) at the timing of the clock signal indicating the lead of the satellite packet period applied from the receiving and transferring section 42. The gate 37 opens all of the ports other than the M port for the main packet period, and opens only a specified port for the satellite packet period applied from the receiving and transferring section 12. In this regard, in FIG. 5B, each of a thin arrow inputting to the main packet generating and transmitting section 34 and a thin arrow inputting to the first selector 36 from the receiving and transferring section 42 indicates a flow of the clock signal indicating the lead of the satellite packet period when the main node operates as a satellite node.

<Explanation of Operation>

FIG. 7 is a view for explaining a detecting process of route control and a network structure (topology) for transferring packet data in the audio network system shown in FIG. 1 or FIG. 2, and shows an example of a configuration (connection status between nodes) of the audio network system. In FIG. 7, an audio network system constructed from one main node (M node) 60 and four satellite nodes (S node 0 to S node 3) 61 to 64 is shown.

Hereinafter, while viewing a configuration example of the audio network system shown in FIG. 7, a transmission and reception operation of a packet carried out in each node, a process related to route control between nodes and a process related to detection of a network structure (topology) will be described.

Figure 7A:
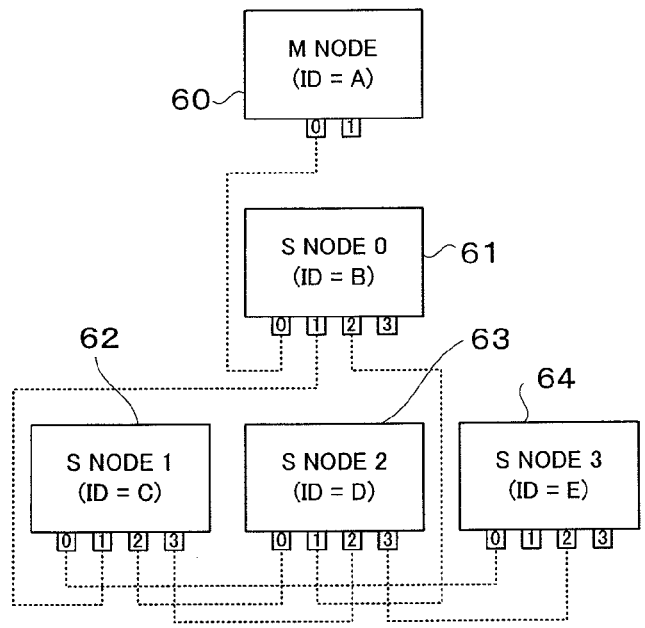
FIGS. 7A-7D are views for explaining a detecting process of route control and topology, and a view showing an example of a configuration (connection status between nodes) of the audio network system.

FIG. 7A shows a state before route selection in which connecting wire between nodes is drawn with dotted lines, and shows that these are unconfirmed connecting wire. At this state, the main node 60 never knows a network structure (topology) of the audio network system to which the main node 60 itself is connected. Further, in each of satellite nodes 61 to 64, it is not determined whether any of four ports "port number 0 (P0)" to "port number 3 (P3)" that each satellite node has becomes an M port.

Figure 8:
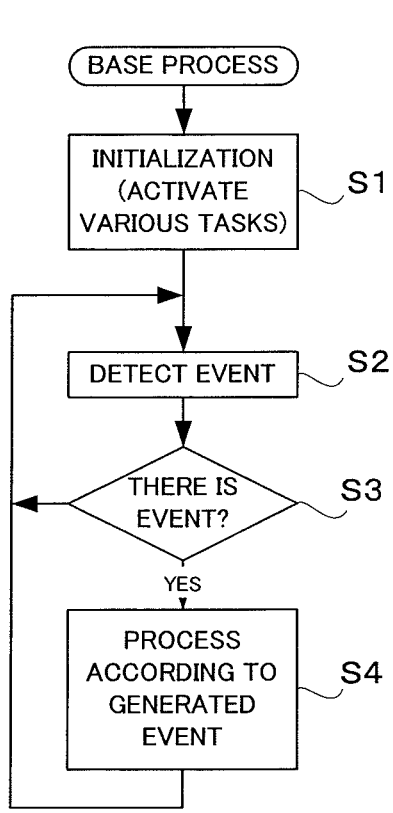
FIG. 8 is a flowchart showing an example of a base process.

FIG. 8 is a flowchart for explaining a base process carried out by the control section 38 of the main node and the control section 17 of the satellite node. This process starts when the audio network system is turned on (when the main node and the satellite node are turned on). At Step S1, a predetermined initializing process is carried out, whereby various tasks are activated. Then, detection of various kinds of events such as an operation detecting event of the operator is carried out (Step S2). Whenever any event is detected ("YES" at Step S3), a process according to the generated event is carried out (Step S4).

<Transmission of Main Packet>

Figure 9:
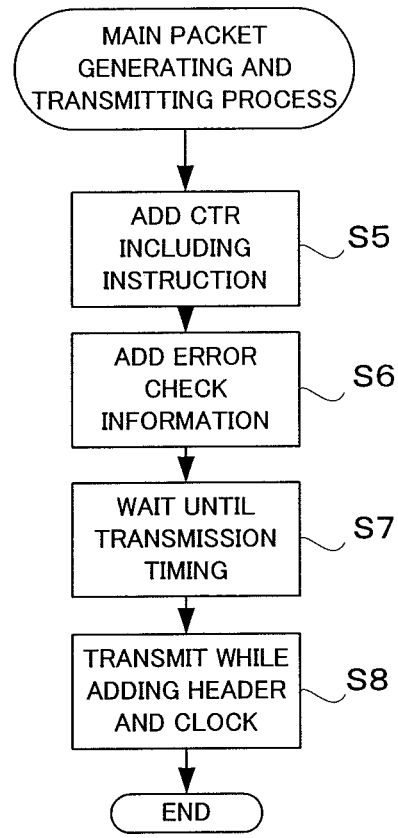
FIG. 9 is a flowchart showing an example of a main packet transmitting process.
Figure 10:
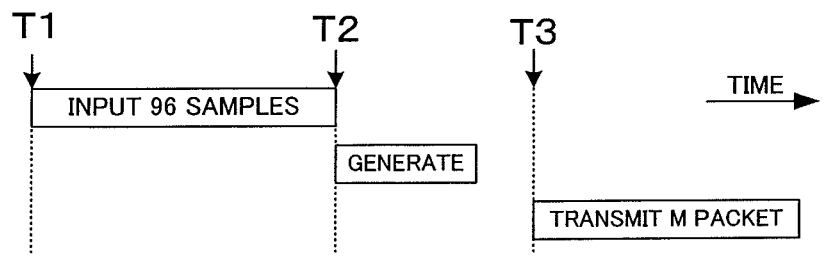
FIG. 10 is a timing chart of a main packet generating and transmitting operation.

In the control section 38 of the main node, a task to transmit the main packet toward the satellite nodes and the like are included in various tasks activated by the initializing process at Step S1. FIG. 9 is a flowchart showing an example of a main packet generating and transmitting process carried out by the main packet generating and transmitting section 34 of the main node. This process is included in a task to start by the initializing process at Step S1 in FIG. 8. Further, FIG. 10 is a view for explaining operation timing of the generating and transmitting process of the main packet. In FIG. 10, a horizontal axis thereof denotes time.

In the main packet generating and transmitting section 34 of the main node, three buffers each of which can store audio signals of 96 samples (sample data) by eight channels are prepared. One of the three buffers (1) is utilized as a buffer for writing the audio signals of the eight channels inputted every sampling period thereinto, another one of them (2) is utilized as a buffer for generating the main packet, and still another one of them (3) is utilized as a buffer for transmitting the main packet. Application of each of the buffers is not fixed, and it is in turn changed among these three kinds of application in accordance with a situation.

The audio signals of the eight channels supplied from the external audio source (Reference numeral 3 in FIG. 1) are respectively converted into digital signals (samples) by the ADC 31 and taken in the ADC 31 every sampling period. The taken digital audio signals of the eight channels are subjected to signal processing in the signal processing section 32 every sampling period, and inputted into the main packet generating and transmitting section 34 of the main node. In the main packet generating and transmitting section 34, each of the audio signals of the eight channels inputted every sampling period is written into the audio signal writing buffer by 96 samples (in FIG. 10, an operation from timing T1 to timing T2). In this embodiment, a time length of a packet transmitting cycle is controlled so that the audio signal of each channel is inputted for 96 samples every packet transmitting cycle (one msec.).

The audio signal writing buffer is separated into a region for writing even samples and a region for writing odd samples. When the audio signals inputted every sampling period are written into the audio signal writing buffer, even samples (sample number S0, S2, . . . S94) and odd samples (sample numbers S1, S3, . . . S95) are separated and written into the even sample region and the odd sample region, respectively.

As shown in FIG. 10, at the time when the audio signals of 96 samples are written into the audio signal writing buffer (timing T2 in FIG. 10), the audio signal writing buffer is converted into a main packet generating buffer, and a main packet generating and transmitting process shown in FIG. 9 is started. Simultaneously, a buffer used to transmit the last main packet is converted into the audio signal writing buffer, and writing of the audio signals inputted hereinafter is carried out for the converted audio signal writing buffer.

At Step S5, the main packet generating and transmitting section 34 adds a control signal (CTR) including a command and the like set in the instruction register 35 or data obtained by dividing the control signal into two to each of the even samples (sample number S0, S2, . . . S94) and the odd samples (sample number S1, S3, . . . S95), generates a set of an even sample group and the control signal (CTR) and a set of an odd sample group and the control signal (CTR), and at Step S6, adds error check information (EC) to each of the sets, and generates data of the main packet for the packet transmitting cycle. The main packet generating and transmitting section 34 then converts the main packet generating buffer into the main packet transmitting buffer, and waits until transmission timing of the main packet (Step S7). In this regard, at this time, there is a possibility that transmission of the last main packet has not been carried out yet.

The main packet generating and transmitting section 34 then adds a header and a clock signal to data for one packet composed of the set of the even sample group and the set of the odd sample group at transmission timing (timing T3 of FIG. 10) of the main packet every packet transmitting cycle (one msec.) to transmit them (Step S8). In FIG. 10, a state where the main packet generating and transmitting section 34 waits for the transmission timing (timing T3) after the main packet is generated, and transmission of the main packet is started is drawn. As described above, the clock signals are embedded in the data of one packet every 83.3 μsec., obtained by evenly dividing the packet transmitting cycle (one msec.) into twelve, at even intervals. Therefore, at Step S8 described above, the data of the main packet are transmitted while the clock signals are embedded at intervals (83.3 μsec.) corresponding to $1/12$ clock of the packet transmitting cycle (one msec.). FIG. 10 is a view illustrating a time relation of each process of input of the audio signal, generation and transmission of the main packet by focusing one main packet. The same process is repeatedly carried out every packet transmitting cycle (one msec.). Namely, each of a series of main packets is continuously transmitted every packet transmitting cycle in accordance with the input signal.

<Route Control>

In the state before route selection in FIG. 7A, the main packet is transmitted from the main node 60 to the satellite nodes 61 to 64 by the process of FIG. 9 described above every packet transmitting cycle. However, at this time, in each of the satellite nodes 61 to 64, it has not determined whether any of the four ports "port number P0" to "port number P3" that each satellite node has becomes an M port yet. Namely, since a route to transfer the main packet from the main node 60 to each of the satellite nodes 61 to 64 has not been selected, the transmitted main packet arrives at only the satellite node 61 that is directly connected to the main node 60.

Thus, the control section 17 of each of the satellite nodes 61 to 64 carries out the M port number setting process shown in FIG. 11 when the audio network system is turned on (or when the network is reset) to set an M port (a port for receiving the main packet) for each satellite node. The M port number setting process is started at initializing at Step S1 in FIG. 8 described above, and is always carried out hereinafter.

At Step S9, zero is set to a check target variable i. Then, at Step S10, the control section 17 sets the variable i to M port number data of the control data register 18. The control section 17 then waits for predetermined time with respect to the port set in the M port number data (port corresponding to the variable i) (Step S11), and confirms a receiving state of the main packet that is to arrive every packet transmitting cycle (Step S12). The waiting time at Step S11 is set to time for a plurality of periods of the packet transmitting cycle. In this embodiment, since the packet transmitting cycle is one msec., the waiting time is set to about 4 msec., for example. In the case where the main packet is not received at the port corresponding to the variable i even after a lapse of the predetermined time ("NO" at Step S13), the control section 17 determines that the port is unsuitable for the M port, and sets a value obtained by adding one to the variable i as a new variable i (Step S14), and the processes after Step S10 are repeated. As the value of variable i is incremented by one, the port number set as the M port number data at Step S9 is shifted by one (where, i≤4). In the case where the variable i becomes four ("YES" at Step S15), the processing flow returns to Step S9 to set zero to the variable i again, and confirmation of main packet reception is carried out from the port P0. A state where the M port number data are changed in turn is called a state where the M port has not determined yet.

In the case where the main packet is received at the port corresponding to the variable i for the predetermined time ("YES" at Step S13), the control section 17 determines that the port corresponding to the variable i is suitable for the M port. By repeating the processes at Steps S11 to S13 hereinafter, a main packet receiving state is monitored at the M port (port number i), and setting of the M port is continued while reception of the main packet can be confirmed. A state where the M port number data are fixed to one port number and are not changed is called a state where the M port has been determined.

This makes it possible to shift a port number (M port number) of the check target from the port P0 one by one in turn, and to determine the port for which periodic reception of the main packet is first confirmed as an M port.

The processes at Steps S11 to S13 are repeated after reception of the main packet is confirmed at the M port to monitor the main packet receiving state. For this reason, in the case where reception of the main packet is lost at the M port (in the case where the route for the M port is cut off), the processing flow branches at Step S13 to "No", and the M port number is shifted to a next port number in turn to check periodical reception of the main packet, whereby the port for which periodical reception of the main packet is newly confirmed can be set automatically so as to be utilized as a new M port.

In this regard, in this embodiment, since the configuration in which each of the satellite nodes 61 to 64 has four ports is assumed, the value of judgmental standard at Step S11 is "4". However, in the case where the number of ports of each satellite node is n other than 4, it is determined at Step S11 whether the check target variable i corresponds with the number of ports n (i=n).

A state where the main port of each satellite node on the audio network system is determined by carrying out the process of FIG. 11 will be described with reference to FIG. 7. The main node 60 starts to transmit the main packet every packet transmitting cycle in the initial state shown in FIG. 7A (a state where any satellite node does not determine an M port). When each of the satellite nodes 61 to 64 carries out the M port number setting process of FIG. 9, the main packet is first received via the port P0 of the satellite node 61 (S node 0) connected to the port P0 of the main node 60. Therefore, the satellite node 61 determines the port P0 as the M port.

The satellite node 61 for which the M port is determined transfers the main packet received via this M port (port P0) from the respective S ports other than the M port to a node of its destination every packet transmitting cycle (operation of the receiving and transferring section 12 in FIG. 5A). Therefore, the main packet transferred by the satellite node 61 every packet transmitting cycle starts to arrive at the satellite nodes 62 (S node 1) and 63 (S node 2) at the same time. The port P1 is then determined as the M port by the M port number setting process in the satellite node 62, while the port P1 is determined as the M port by the M port number setting process in the satellite node 63. Since the M port number setting processes in the satellite nodes 62 and 63 are carried out at independent timing of each other, determination of the M port in these two nodes is not always carried out at the same time.

Since each of the satellite nodes 62, 63 in which the M port is determined transfers the main packet, received at the determined M port every packet transmitting cycle, from each of the S ports, the main packet is to arrive at the satellite node 64 (S node 3) from both of the satellite nodes 62 and 63 every packet transmitting cycle. Although one port is determined as the M port in the satellite node 64 by the M port number setting process, in this case, whether any of the port P0 and port P2 is determined as the M port is incidentally determined on the basis of a relation between timing when the main packet starts to arrive at each port and timing when the ports are checked in turn.

Thus, the M port of each satellite node is basically determined automatically in the order from an upstream side of the route (at which the main packet is to arrive early) by the independent M port setting process in each satellite node. It should be noted that whether any port of each satellite node is determined as the M port is incidentally determined on the basis of check timing of each port in the satellite node and timing when the main packet starts to arrive at each port from other nodes, and the port that exists at the shortest distance from the main node is not always determined (the shortest route is not always selected).

Figure 7B:
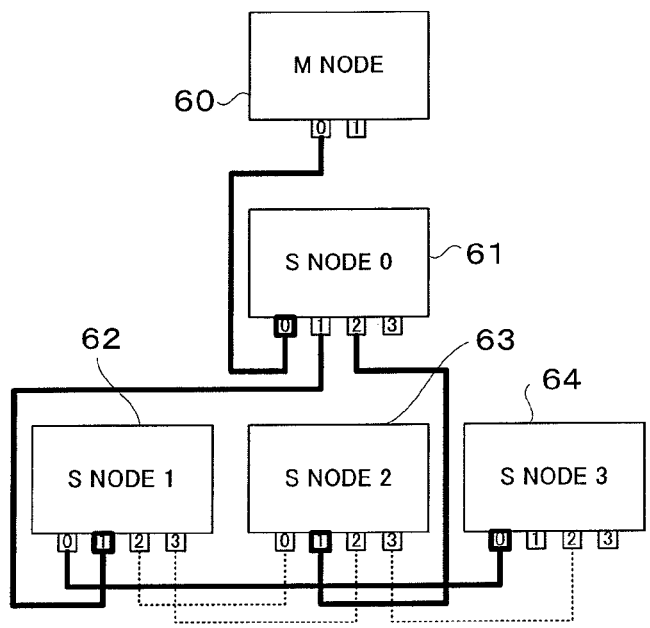

In the case where the M port is determined in each of the satellite nodes 61 to 64, the route to transfer the main packet from the main node 60 to each of the satellite nodes 61 to 64 is determined. FIG. 7B shows a state where the route is determined in which the determined M port in each node is shown by heavy frames and connecting wire of the determined route is shown by heavy lines. The main packet is transferred from the main node 60 to each of the satellite nodes 61 to 64 through the route drawn with the heavy lines. However, at this time (the time when the main node 60 does not carry out "topology detection" (will be described later)), the main node 60 does not recognize or detect this selected route. The route to transfer the main packet on the audio network system is merely determined automatically.

In FIG. 7B, for example, in the satellite node 62 (S node 1), the port P1 connected to the port P1 of the satellite node 61 is set to the M port. At this state, in the case where a failure occurs on the route between the port P1 of the satellite node 61 and the port P1 of the satellite node 62 (for example, in the case where connection is cut off), the satellite node 62 checks reception of the main packet in the order from the port P2, and determines a port of the main packet for which periodical reception is confirmed as a new M port because the main packet does not arrive at the port P1 of the satellite node 62. Namely, in the case of the state of FIG. 7B, either the port P2 or the port P3 is to be set to the new M port.

Thus, according to the present embodiment, even in the case where a failure occurs on a route, by means of relatively simple control to check the ports one by one in each satellite node and to set the port for which reception of the main packet is confirmed to the M port, the route can be changed automatically (dynamic routing), and the failure can be avoided. The automatic route changing process carried out by each satellite node can be achieved by a simple process (M port number setting process) for which complex control such as generation of a routing table is not required.

Further, as shown in FIG. 2 described above, in the case of the network structure having a plurality of main nodes (a configuration in which main nodes are multiplexed), only one of the plurality of main nodes operates as the main node (main operation), and the others operate as the satellite node (satellite operation). Therefore, the main node that carries out the satellite operation carries out the M port number setting process, and the M port (port at which the main packet is received) is set. FIG. 12 is a flowchart showing an M port number setting process carried out by the control section 38 of the main node that carries out a satellite operation. This M port number setting process is started at the initializing at Step S1 in FIG. 8 described above, and is always carried out hereinafter. In the M port number setting process carried out by the control section 38 of the main node that carries out the satellite operation, a process of switching the operation of the main node from the satellite operation to the main operation is included. In this regard, in the process of FIG. 12, it is assumed that the main node has a configuration with two ports (P0, P1).

At Step S100 in FIG. 12, the control section 38 sets each of check target variables i, j to zero. Here, the variable j is a port number of the port in which reception of the main packet is finally detected, while the variable i is the number of checks from the time when reception of the main packet is not detected. At Step S101, the control section 38 then sets a value of a formula mod[(i+j)/2] as the M port number data of the control data register 39. The formula mod[(i+j)/2] is a function for obtaining a remainder of division "(i+j)/2". A denominator "2" in a square bracket is the number of ports with which the main node is provided. In the case where the number of ports is n other than two, the port number is obtained by the formula mod[(i+j)/n]. In the case where each of the variables i, j is zero, the M port number data (a value of the formula mod[(i+j)/2]) become "0". Therefore, it is possible to start checks in ascending order of the port numbers.

The control section 38 waits for predetermined time (Step S102) with respect to the port number (mod[(i+j)/2]) set to the M port number data, and confirms the receiving state of the main packet (Step S103). Here, the waiting time of Step S102 may be the same as the waiting time of Step S12, or may be different from the waiting time of Step S12. In the case where the main packet is not received at the check target port even after a lapse of the predetermined time ("NO" at Step S104), it is determined that the port corresponding to the value of the formula mod[(i+j)/2] is unsuitable as the M port. At Step S105, a value obtained by adding one to the variable i is set to a new variable i, and the processes after Step S101 are repeated. In the case where a value of the variable i is incremented by one, the port number (mod[(i+j)/2]) is shifted by one in the port numbers (in this case, "0" and "1") of the ports that the main node has.

In the case where the main packet is received at the check target port in the predetermined time ("YES" at Step S104), the control section 38 determines that the port (port number=mod[(i+j)/2]) is suitable as the M port. At Step S106, the control section 38 sets the formula mod[(i+j)/2] (current M port number) to the variable j, and sets "0" to the variable i. Then, by repeating the processes after Step S102, the main packet receiving state is monitored at the M port (port number=mod[(i+j)/2]), and setting of the M port is continued while reception of the main packet can be confirmed.

In the case where reception of the main packet is lost at the M port (in the case where the route for the M port is cut off), the processing flow branches at Step S104 to "No", at Step S105, a value obtained by adding one to the variable i is set to a new variable i, and the processes after Step S101 are carried out. At Step S105 described above, the formula mod[(i+j)/2] (current M port number) is set to the variable j, and "0" is set to the variable i. Therefore, the M port number (mod[(i+j)/2]) newly set at Step S101 becomes a next port number of the last M port number. Namely, in the case where the last M port number is P0, the newly set M port number becomes P1. In the case where the last M port number is P1, the newly set M port number becomes P1. By shifting the check target port in turn, the port for which reception of the main packet is first confirmed is set to the M port.

Namely, the M port number setting process carried out at the main node that carries out the satellite operation is similar to the M port number setting process of the satellite node shown in FIG. 11 in that the check target port is shifted one by one to confirm reception of the main packet, the port is continuously set to the M port while reception of the main packet is confirmed, and in the case where reception of the main packet is lost, the M port number is shifted to a next port number in turn to check periodical reception of the main packet and the port for which the periodical reception of the main packet is newly confirmed is set as a new M port.

In the processes of FIG. 12, in the case where a value of the variable i becomes a predetermined value k ("YES" at Step S107), a process to switch an operation of the main node from a satellite operation to a main operation is carried out at Steps 5108 and S109. This predetermined value k is a value set as a standard for determining whether each main node is caused to start the main operation or not. When the determination that a main node is "unsuitable as the M port" is made for the kth times in a row, the main node starts a main operation. Since in each main node its ports should be checked at least through the ports, the predetermined value k is set to a value equal to or more than the number of ports that each main node itself has. When route selection is not terminated yet (FIG. 7A, when the audio network system is turned on or when the network is reset), the predetermined value k may be a different value for each main node so that route selection is carried out without problems even though each main node starts the M port number setting task at about the same time. Then, after the route has been selected once (FIG. 7B), the predetermined value k may be the untouched value, or may be changed so as to become the same value between the main nodes.

Since zero is set to the variable i at the process start (Step S100) and zero is set to the variable i after the M port is determined (Step S105), the value of the variable i becomes k only in the case where the two ports P0 and P1 are checked total kth times and as a result reception of the main packet has never detected, in other words, only in the case where the processing flow branches at Step S104 to "No" kth times in a row. Therefore, in the case where the value of the variable i becomes k ("YES" at Step S107), the control section 38 of the main node determines that there is no main node that carries out the main operation on the audio network system, stops various tasks for the satellite operation (Step S108), and activates various tasks for the main operation (Step S109).

Thus, even though the main node that carries out the main operation disappears on the audio network system, the main node that carried out the satellite operation (substantial satellite node) is automatically switched to a main node that carries out the main operation, and takes over the tasks such as transmission of the main packet. Therefore, it is possible to continue the operations of the audio network system.

<Transfer of Packet>

Next, an operation of packet transfer in the satellite node to which the M port is set and an operation of reception of the main packet (audio signal) will be described. In this regard, although the operation carried out by the satellite node will be described here, the main node also carries out the same operation while the main node carries out the satellite operation.

Figure 13:
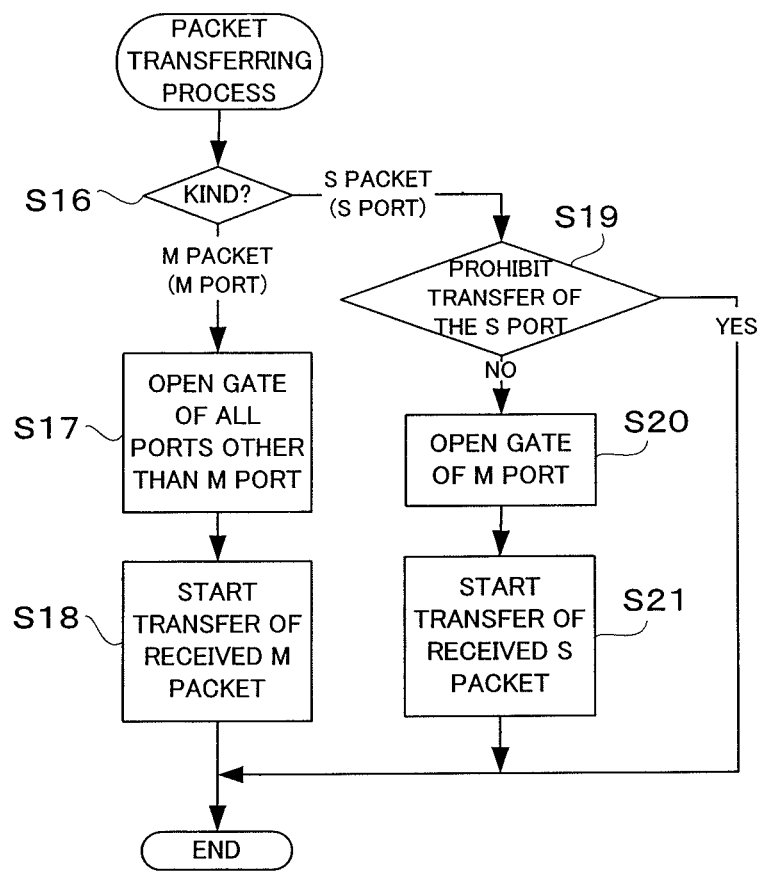
FIG. 13 is a flowchart showing an example of a packet transferring process in the satellite node.

FIG. 13 is a flowchart for explaining an operation of the receiving and transferring section 12 (operation of hardware) when it is notified to start to receive the main packet or satellite packet by the reception detecting signal (dotted line in FIG. 5A) in the satellite node. At Step S16 in FIG. 13, the receiving and transferring section 12 determines whether a kind of packet started to receive is a main packet (M packet) or a satellite packet (S packet). Timing when start of reception of a packet is detected is a main packet period. In the case where the start of reception is notified at the M port by the reception detecting signal, the receiving and transferring section 12 causes the selector 11 to select the M port, and receives the main packet received at the M port. Here, a current M port is determined by the M port number data set to the control data register 18. In this case, the processing flow branches at Step S16 to "M packet". At Step S17, the receiving and transferring section 12 opens the gate 14 for all ports (S ports) other than the M port, and at Step S18, the receiving and transferring section 12 starts to transfer the currently receiving main packet from the lead thereof while receiving the main packet. Thus, the main packet is transferred from each S port toward a downstream side of the route.

Further, in the case where timing to detect reception of the packet is a satellite packet period and start to receive at any one S port is notified by the reception detecting signal, the receiving and transferring section 12 causes the selector 11 to select the S port, and receives the satellite packet received at the S port. In this regard, it is not supposed to notify start of reception at a plurality of S ports for one satellite packet period in view of system design. However, in the case where start of reception at a plurality of S ports is notified under some kinds of circumstances, the selector 11 is caused to select the S port for which start of reception is first notified from the S ports, and receives only the satellite packet from the selected S port. At Step S19, the receiving and transferring section 12 checks whether the S port for which the start of reception is notified is set to prohibition of transfer or not on the basis of the prohibited port data of the control data register 18. It will be described later in what case a port is set to prohibition of transfer. In the case where the S port is not set to prohibition of transfer ("NO" at Step S19), at Step S20, the receiving and transferring section 12 opens the gate 14 of the M port. A current M port number is determined on the basis of the M port number data set to the control data register 18. At Step S21, the receiving and transferring section 12 starts to transfer the received satellite packet from the lead thereof. Thus, the main packet is transferred from the M port to an upstream side of the route.

<Reception of Main Packet (Reproduction of Audio Signal)>

Figure 14:
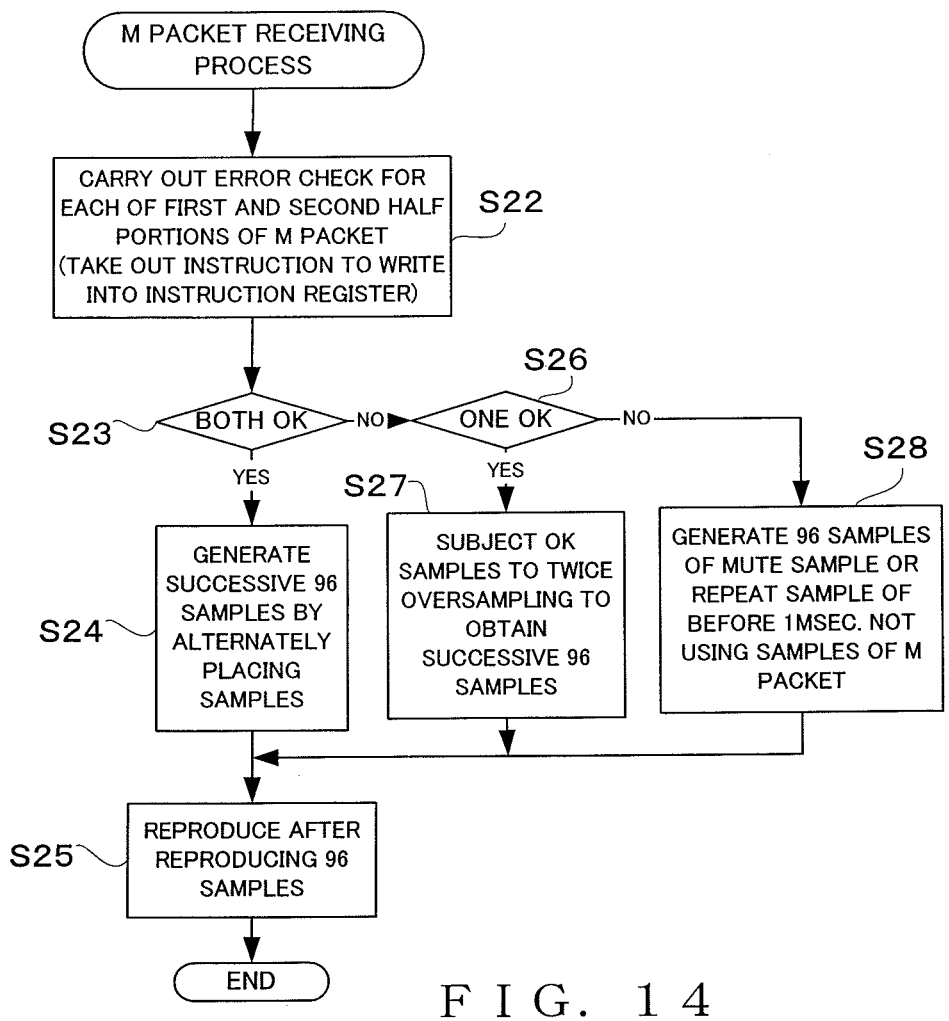
FIG. 14 is a flowchart showing an example of a main packet receiving process in the satellite node.
Figure 15:
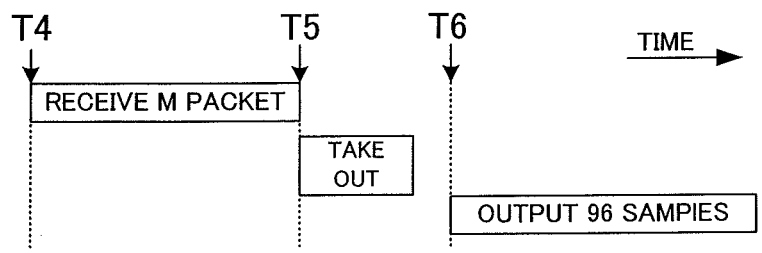
FIG. 15 is a timing chart of a reception operation of a main packet and a reproduction operation of an audio signal.

FIG. 14 is a flowchart for explaining an operation (operation of hardware) of the receiving and transferring section 12 when reception of the main packet by a packet transmitting cycle (one msec.) is completed in the satellite node. Further, FIG. 15 is a view for explaining operation timing of the process to receive a main packet by a packet transmitting cycle (one msec.) and to reproduce audio signals (96 samples) in the received main packet. In this regard, a horizontal axis in FIG. 15 denotes time. Further, two buffers (large) capable of storing audio signals of 96 samples (sample data) for eight channels and two buffers (small) capable of storing them for one channel are prepared in the receiving and transferring section 12 of the satellite node. One of the two buffers (large) of the former is (1) utilized as a buffer for receiving a main packet, and the other is (2) utilized as a buffer for data check of the received main packet. Further, one of the two buffers (small) of the latter is (1) utilized as a buffer for writing the audio signal (sample) extracted from the main packet, and the other is (2) utilized as a buffer for reproducing the extracted audio signal. Application of each of the buffers (large) and the buffers (small) is not fixed, and it is changed in turn between the corresponding two kinds of application in accordance with the situation.

In FIG. 15, the receiving and transferring section 12 starts to receive the main packet via the M port every packet transmitting cycle (one msec.) (timing T4 in FIG. 15), and stores data on the main packet every packet transmitting cycle (one msec.) in the main packet receiving buffer from the lead thereof. The data of the main packet every packet transmitting cycle (one msec.) correspond to the "Data 1" to "Data 11" of FIG. 3, and are composed of audio signals of eight channels for 96 samples and control signals.

In the data of the main packet every packet transmitting cycle (one msec.), as explained with reference to FIG. 3, 12 clock signals are embedded every 83.3 μsec. Therefore, the receiving and transferring section 12 detects reception timing of each clock signal received every 83.3 μsec., and transmits the reception timing of each clock signal to the oscillator (OSC) 22. It is described above that the OSC 22 synchronizes with the reception timing of each clock signal to generate a sampling clock (96 kHz), and the sampling clock synchronized with the sampling clock of the main node is reproduced.

At the time when reception of the main packet every packet transmitting cycle (one msec.) is completed (timing T5 in FIG. 15), the process of FIG. 14 is started. The receiving and transferring section 12 switches their roles between the receiving buffer and the data check buffer, and carries out an error check for each of data on a first-half portion of the main packet and data on a second-half portion of the main packet and recovery of the data in the case where an error is detected (if possible) on the basis of error check information (EC) on the main packet, whose reception is completed, in the data check buffer. Then, the receiving and transferring section 12 extracts the audio signal of one channel indicated by the reception channel number data set in the control data register 18 for 96 samples from the packet to write it into the writing buffer, and extracts the command (control signal CTR) included in the same packet to write it into the instruction register 15 (Step S22 in FIG. 14).

As explained with reference to FIG. 3, the data of one main packet ("Data 1" to "Data 11") are composed of two parts including a set of the even sample group, the control signal and the error check information and a set of the odd sample group, the control signal and the error check information. Since the data of the main packet are received from the header portion in turn, the set of even sample group and the set of odd sample group are separated into the first-half portion and the second-half portion of the received main packet, respectively. Namely, the error check for "the first-half portion and the second-half portion of the main packet" is to check an error of the sample group of the even sample group (that is, sample group of even samples) using the error check information added to the even sample group, and to check an error of the sample group of the odd sample group (that is, sample group of odd samples) using the error check information added to the odd sample group. In the error check for each group, in the case where the data in which an error occurs are small even when the error is detected, the data can be recovered on the basis of the error check information. Therefore, not only in the case where no error is detected in a group, but also in the case where data of a portion can be recovered even when an error is detected in the portion, the data of the group can be utilized (OK). Hereinafter, "OK" cases including this case are expressed as "there is no error". On the other hand, in the case where an error is detected in a group and the data cannot be recovered, the data of the group cannot be utilized (NG), and therefore, it is expressed "there is an error". In this regard, although the error check based on the error check information is fundamental, a function of data recovery may not be necessary and be an option.

As a result of the error check, in the case where there is no error in both the first-half portion and the second-half portion (even sample group and odd sample group) of the main packet ("YES" at Step S23), at Step S24, successive 96 samples are generated by alternately placing (arranging) the first-half portion and the second-half portion (even sample group and odd sample group) of the main packet one sample by one sample, and the receiving and transferring section 12 waits until reproduction timing.

Then, at Step S25, after the 96 samples (the audio signals generated from the data of the main packet in the last packet transmitting cycle (last one msec.)) are currently reproducing from the reproducing buffer, the 96 samples (the audio signals generated from the data of the main packet in the packet transmitting cycle) generated at Step S24 and written into the writing buffer are synchronized with the sampling clock generated by the OSC 22 to reproduce them. More specifically, at the timing to reproduce the 96 samples (timing T6 in FIG. 15), the current writing buffer is converted into a reproducing buffer, the current reproducing buffer is converted into a writing buffer, and the 96 samples of the new reproducing buffer are outputted one sample by one sample every sampling period indicated by the sampling clock generated by the OSC 22.

On the other hand, as a result of the error check, in the case where there is an error in any one of the first-half portion and the second-half portion (even sample group and odd sample group) of the main packet ("NO" at Step S23, and "YES" at Step S26), at Step S27, the 48 samples of the group (even sample group or odd sample group) of the samples in which there is no error are subjected to twice oversampling, whereby the successive 96 samples are generated using only the sample group of one group and are written into the writing buffer. Then, at the timing T6 to be reproduced, the successive 96 samples generated at Step S27 are reproduced (Step S25).

Thus, even in the case where there is an error in any one of the even sample group (i.e., first error) and the odd sample group (i.e., second error), the audio signals can be reproduced using the other group. In this case, a sampling frequency decreases by half and a quality of the audio signals is somewhat deteriorated, but it is far well than the case where the error portion becomes "silent" due to lack of the data.

Further, as a result of the error check, in the case where there are errors in both the first-half portion and the second-half portion (even sample group and odd sample group) of the main packet ("NO" at Step S23, and "NO" at Step S26), at Step S28, the reproducing audio signals fade out from the reproducing buffer, and silent 96 samples (i.e., "silent audio signals") are written into the writing buffer in place of the samples received at the packet transmitting cycle (mute sound), or the reproducing 96 samples in the reproducing buffer are written into the writing buffer as they are or after attenuation (repeat sound). Then, at the timing T6 to be reproduced, the 96 samples of mute sound or the 96 samples of repeat sound are reproduced (Step S25).

In this regard, the flowcharts of FIGS. 13 and 14 described above are ones for explaining the operation when start of the reception of the main packet is detected at one packet transmitting cycle and the operation when reception of the main packet is completed, respectively. For this reason, they are drawn so that the process is terminated by one loop. In fact, since reception of the main packet is detected every packet transmitting cycle (one msec.) and reception of the main packet is completed every packet transmitting cycle (one msec.), each of the operations shown in FIGS. 13 and 14 is repeated every packet transmitting cycle (one msec.).

As described above, although this embodiment is described with reference to FIGS. 9 to 15, this is an operation immediately after transmission, reception and transfer of the main packet and route control (setting of the M port in each satellite node) required for transfer of the main packet in the audio network system according to this embodiment.

<Topology Detection>

In a state immediately after the route selection shown in FIG. 7B (setting of the M port in each of the satellite nodes), a route to transfer the main packet is merely selected, and the main node 60 delivers the audio signals to the satellite nodes by means of the periodically transmitted main packet. However, since the main node 60 does not recognize the network structure (topology), that is, which route any satellite node is connected to, the main node 60 cannot specify any satellite node separately and remotely control it.

Hereinafter, a network structure (topology) detecting process and a connection confirming process carried out by the main node 60 will be described. By carrying out the network structure (topology) detecting process and the connection confirming process periodically, the main node 60 can generate data indicating a network structure (topology) and dynamically recognize the network structure (topology). In this regard, the word "topology" in this specification indicates all of the main nodes and the satellite nodes and connecting wire functioning as routes to transfer a main packet in the audio network system in which the main nodes and the satellite nodes are physically connected to each other by means of the cables (connecting wire). Further, the connecting wire that is not utilized as a transmission route of a main packet of the connecting wire in the audio network system is called "spare wire". In this regard, in the detection of the topology, the main node that carries out a satellite operation carries out the same operation as the satellite nodes. In the explanation for this topology detection, in order to simplify the explanation, the main node that carries out the satellite operation is also called a satellite node.

FIG. 16 is a view for explaining transition of the network structure data according to progress of the topology detecting process and the connection confirming process. In FIG. 16, a network corresponds to the audio network system shown in FIG. 7 (network system constructed from one main node 60 and four satellite nodes 61 to 64). FIG. 16A is the content of a state immediately after the route selection (before the topology detecting process). At this state, the main node 60 merely understands that the main node 60 itself exists (ID=A) and has two ports (P0 and P1), topology of destinations of the P0 and P1 is unconfirmed (in FIG. 16, topology unconfirmed is indicated by a mark "*"). Hereinafter, a state where topology is detected through the topology detecting process will be described.

Figure 17:
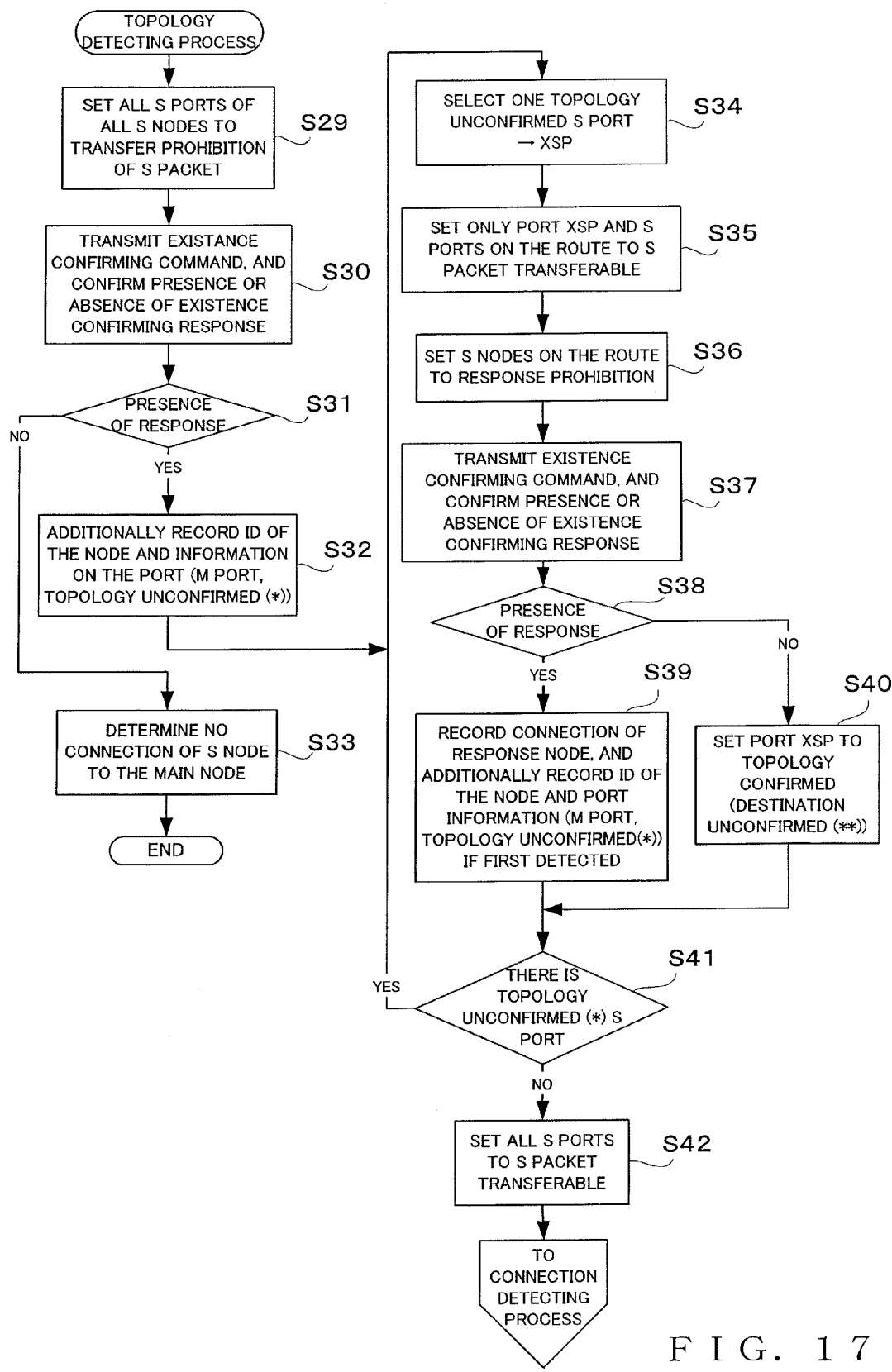
FIG. 17 is a flowchart showing an example of a topology detecting process in the main node.

FIG. 17 is a flowchart showing an example of a topology detecting process carried out by the control section 38 of the main node 60. This process is a process periodically carried out by the control section 38 of the main node 60 every predetermined timing, and runs in the background separately from a main operation of the main node 60 (transmission of a main packet (audio signals)).

At Step S29, the main node 60 generates a transfer prohibiting command to instruct all S ports, which each of the nodes has, to prohibit transfer of a satellite packet, adds a broadcast ID to the transfer prohibiting command (here, the command is addressed to all nodes including unknown node(s)), and transmits it with a main packet. Each of the satellite nodes 61 to 64 that receive the main packet including this transfer prohibiting command extracts the transfer prohibiting command from the main packet to set it to the instruction register 15.

Figure 18:
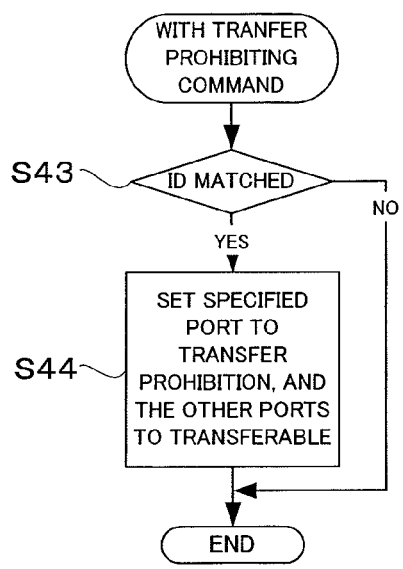
FIG. 18 is a flowchart for explaining an operation in response to a transfer prohibiting command in the satellite node.

FIG. 18 is a flowchart showing an example of a process carried out by the control section 17 when the control section 17 of each of the satellite nodes 61 to 64 receives the transfer prohibiting command from the instruction register 15. The control section 17 of each of the satellite nodes 61 to 64 compares the ID added to the transfer prohibiting command with its own ID to check whether the command is addressed to the satellite node itself. In the case where the transfer prohibiting command is addressed to the satellite node itself ("YES" at Step S43), the control section 17 sets prohibited port data for prohibiting transfer of a satellite packet for the port specified by the transfer prohibiting command to the control data register 18 (Step S44). The prohibited port data are also data for permitting transfer of a satellite packet for ports that are not specified. The broadcast ID to set all nodes to the destination is added to the transfer prohibiting command transmitted at Step S29, and the transfer prohibiting command is a command for prohibiting transfer of a satellite packet for all S ports. For this reason, the control section 17 of each of the satellite nodes 61 to 64 sets the prohibited port data for prohibiting transfer of a satellite packet for all S ports (three ports other than M port) of the satellite node to the control data register 18. In this case, since transfer of a satellite packet is prohibited here, the main packet transmitted from the main node 60 can be transferred continuously.

At Step S30 in FIG. 17, the main node 60 transmits the main packet including an existence confirming command to all of the satellite nodes 61 to 64, and confirms whether there is a reply of the satellite packet including an existence confirming response from any satellite node separately for each of the two ports P0, P1. This existence confirming command is a command transmitted to confirm a node connected to a port in the case where the connected node is unknown. Thus, an ID of the node for the destination cannot be identified. Therefore, a broadcast ID is always added to the existence confirming command. In the main node 60 having a plurality of ports, the main packet including the same instruction data is transmitted from all of the ports at the same time. Since the main packet including the same existence confirming command is transmitted from both of the ports P0, P1 at the same time at Step S30, the satellite packet including the existence confirming response is replied from each of both of the ports if the satellite nodes are respectively connected to both of the ports. For that reason, here, the main node 60 selects any one of the ports P0, P1 by the selector 45 in advance to send the existence confirming command via the selected port, and selectively receives the satellite packet from the port so as to separately confirm the existence confirming response.

Figure 19:
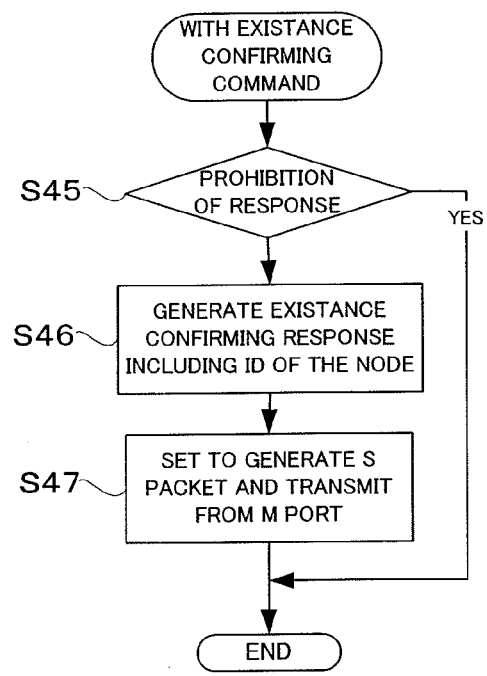
FIG. 19 is a flowchart for explaining an operation in response to an existence confirming command in the satellite node.

The receiving and transferring sections 12 of all of the satellite nodes 61 to 64 receive the existence confirming command broadcasted from the main node 60, and write the received existence confirming command into the instruction registers 15, respectively. FIG. 19 is a flowchart showing an example of a process carried out by the control section 17 of each of satellite nodes 61 to 64 when the control section 17 receives the existence confirming command from the instruction register 15. The control section 17 of each of the satellite nodes 61 to 64 confirms whether a "response prohibiting command" against the existence confirming command is set to the instruction register 15 of the satellite node or not at Step S45. The "response prohibiting command" will be described later. At the present stage, all of the satellite nodes 61 to 64 are not set to prohibition of a response ("NO" at Step S45). The control section 17 of each of the satellite nodes 61 to 64 generates existence confirming response data including the ID of the satellite node and port information (information on the number of ports and an M port number) (Step S46), generates a satellite packet on the basis of the generated existence confirming response data, and sets up so as to transmit the satellite packet from the M port (Step S47). More specifically, an instruction to transmit the satellite packet from the M port corresponding to the M port number of the control data register 18 and the generated existence confirming response are set to the response register 19.

Figure 20:
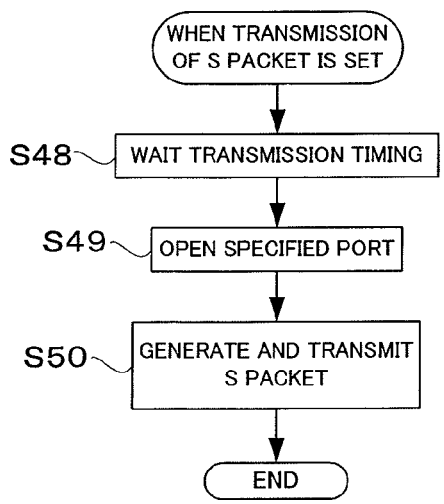
FIG. 20 is a flowchart for explaining an operation when transmission of a satellite packet is set in the satellite node.

FIG. 20 is a flowchart showing a satellite packet transmitting operation carried out by the receiving and transferring section 12 when an instruction to transmit a satellite packet is set to the response register 19 by the control section 17 of the satellite node. The receiving and transferring section 12 waits for timing to transmit the satellite packet (timing of the clock signal indicating the lead of the satellite packet period) (Step S48). When it becomes the transmission timing, the receiving and transferring section 12 opens the gate 14 of the packet transmitting port (the M port set at Step S47 described above) set to the response register 19 (Step S49), causes the satellite packet generating and transmitting section 20 to generate a satellite packet on the basis of the data of the response register 19, and transmits the generated satellite packet from the packet transmitting port set to the response register 19 (Step S50). Thus, the satellite packet including the existence confirming command is transmitted from the M port.

Returning to FIG. 17, at this stage (stage at Step S30), all of the satellite nodes 61 to 64 that receive the existence confirming command reply the existence confirming response. However, since prohibition of transfer of the satellite packet is set to all S ports of all of the satellite nodes 61 to 64 at Step S29 as described above, an existence confirming response of each of nodes other than the satellite nodes directly connected to the ports P0, P1 of the main node 60 is not transferred. Therefore, in the configuration example of the audio network system shown in FIG. 7, only a reply from the M port P0 of the satellite node 61 connected to the port P0 of the main node 60 arrives at the main node 60.

When the satellite packet including the existence confirming response is received from the satellite node ("YES" at Step S31), the main node 60 additionally records the ID (=B) of the satellite node 61 and port information of the node from the satellite packet in the network structure data (Step S32).

FIG. 16B shows the content of the network structure data at the time when the port P0 of the main node 60 is checked and the satellite node 61 (S node 0) is discovered. At this state, in the network structure data, the fact that the M port P0 of the satellite node 61 (ID=B) is connected to the port P0 of the main node 60 (the content of "destination ID" and "port" fields for "M node A" and "P0") is recorded, the ID (=B) of the satellite node 61 and port information of the satellite node 61 (information on the number of ports and the M port number) are additionally recorded, and further, the fact that the P0 of the main node 60 (ID=A) is connected to the P0 of the satellite node 61 (in FIG. 16, the content of "destination ID" and "port" fields for "S node 0" and "P0") is written.

In this regard, in FIG. 16, information on the M port number is recorded by a master port flag "M" set to each port of each node. The master port flag "M" is a two-valued flag indicating that the port is the M port by "1" and indicating that the port is the other ports (S ports) by "0". Moreover, "topology unconfirmed" (indicated by a mark "*" in FIG. 16) is recorded in the destination ID field for each of three S ports of the satellite node 61 (ID=B). Further, the master port flag "M" for the ports P0, P1 of the main node 60 becomes "no value".

Further, in the configuration example of the audio network system shown in FIG. 7, since no node is connected to the port P1 of the main node 60, no existence confirming response is returned from the port P1 of the main node 60. Thus, the content of the network structure data after check of the port P1 of the main node 60 becomes as shown in FIG. 16C. At this time, since the main node 60 carries out only confirmation of topology, that is, confirmation of a portion through which the route passes, it is unconfirmed whether any node is connected to the port P1 or not. Therefore, as shown in FIG. 16C, "destination unconfirmed" (indicated by a mark "**" in FIG. 16) is recorded in the destination ID field for the P1 of the M node A in the network structure data.

In this regard, in the case where the main node 60 does not receive any satellite packet including an existence confirming response from any satellite node via any port ("NO" at Step S31), it is determined that there is no connection of the satellite nodes to the main node 60 (Step S33), and the topology detecting process is terminated.

At Step S34, the control section 38 of the main node 60 selects one of the S ports of topology unconfirmed in the network structure data to an S port XSP for a check target. In a state after check of each of the ports P0, P1 of the main node 60 (state shown in FIG. 16C), since all of the three S ports P1 to P3 of the satellite node 61 are "topology unconfirmed", one of these is selected as the XSP. The selection of the XSP is carried out in the order of port number. Namely, the S port P1 of the satellite node 61 is first selected as the XSP.

At Step S35, the main node 60 transmits a transfer prohibiting command with the main packet to prohibit transfer of a satellite packet for all S ports other than the following S ports to each of the satellite nodes in turn so as to permit transfer of the satellite packet for only the S port selected as the XSP and the respective S ports on a transmission route (hereinafter, referred to as "the route") of the main packet from the main node 60 to the S port. "The route" is also a route on which the satellite packet received at the port XSP goes through until the satellite packet arrives at the main node 60.

In the case where the XSP is the S port P1 of the satellite node 61 and the satellite packet received at the S port P1 of the satellite node 61 is to be transferred, the packet is sent out from the M port P0 of the satellite node 61, and directly arrives at the main node 60. For this reason, there is no "S port on the route". Therefore, at this stage, the control section 17 of the satellite node 61 rewrites the prohibited port data of the control data register 18 for only XSP=the S port P1 of the satellite node 61 into permission to transfer a satellite packet in accordance with the command at Step S18. Therefore, all S ports of all of the satellite nodes other than the S port P1 of the satellite node 61 are prohibited from transferring a satellite packet.

Further, at Step S36, the main node 60 transmits a response prohibiting command, with the main packet, to instruct prohibition of a response to the existence confirming command to each of the satellite nodes on "the route" in turn. Since existence of each of the satellite nodes on "the route" has already been confirmed and the ID has been turned out, it is possible to transmit the command addressed to the satellite node (command to which the ID of the satellite node is added).

Figure 21:
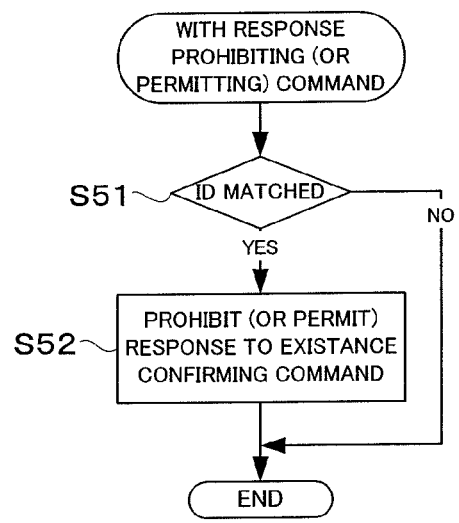
FIG. 21 is a flowchart for explaining an operation in response to a response prohibiting (or permitting) command in the satellite node.

FIG. 21 is a flowchart showing an example of a process carried out by the control section 17 of each of the satellite nodes 61 to 64 when the control section 17 receives a response prohibiting (or permitting) command from the instruction register 15. The control section 17 compares the ID added to the response prohibiting (or permitting) command with its own ID to check whether or not the command is addressed to the satellite node itself. In the case where the response prohibiting (or permitting) command is addressed to the satellite node ("YES" at Step S51), prohibition (or permission) of the response to the existence confirming command is set in the control data register 18 (Step S52).

When the XSP is the S port P1 of the satellite node 61, a "satellite node on the route" is only the satellite node 61 itself. Therefore, only the satellite node 61 cannot respond to the existence confirming command (generation and transmission of a packet of the existence confirming response) by the process at Step S36 in FIG. 17.

At Step S37 in FIG. 17, the main node 60 transmits the main packet including the existence confirming command to all of the satellite nodes 61 to 64, and confirms presence or absence of a reply of the satellite packet including the existence confirming response from the satellite node.

All of the satellite nodes 62 to 64 except for the satellite node 61 that is prohibited from responding respond to the existence confirming command transmitted from the main node 60. However, since permission of transfer of the satellite packet is set to only the S port P1 of the satellite node 61 at Step S35 as described above, only the satellite packet received at the S port P1 by the satellite node 61 is sent out from the M port P0 of the satellite node 61, and arrives at the main node 60. Therefore, in the configuration example of the audio network system shown in FIG. 7, only the existence confirming response transmitted from the node connected to the S port P1 of the satellite node 61, that is, the satellite node 62 (S node 1) arrives at the main node 60.

When the existence confirming response is received ("YES" at Step S38), the main node 60 records information on the destination for the check target port XSP of the network structure data on the basis of the received existence confirming response (Step S39). Namely, the contention of the S port P1 of the satellite node 61 (S node 0), that is, the "destination ID=C (satellite node 62)" and the "port number=P1" is written into the network structure data. Further, in the case where the satellite node 62 for the destination is first detected, the ID of the satellite node (S node 1) 62 (=C) and the port information (information on the number of ports and the M port number) are additionally recorded in the network structure data on the basis of the received existence confirming response, and the fact that the port "P1" of the "S node 1" additionally recorded is connected to the check target port XSP (the content of the "destination ID=B" and the "port number=P1") is written into the network structure data.

FIG. 16D shows the content of the network structure data immediately after the S port P1 of the satellite node 61 is checked. At this state, the main node 60 recognized that the S port P1 of the satellite node 61 is connected to the M port P1 of the satellite node 62, and that there are topology unconfirmed S ports P0, P2 and P3 in the satellite node 62.

In the case where there is a topology unconfirmed S port (one indicated by the mark "*") on the network structure data, the main node 60 returns the process to Step S34 ("YES" at Step S41), and hereinafter, the main node 60 carries out the processes in the same manner. The check is carried out every one check target port XSP.

FIG. 16E shows the content of the network structure data immediately after the S ports P2, P3 of the satellite node 61 are checked after the check of the S port P1 of the same satellite node 61. When the S port P2 of the satellite node 61 is selected as the XSP, at Step S35, only the "S port P2 of the satellite node 61" and the S ports on the route are permitted to transfer a satellite packet, and the satellite node 61 is prohibited from responding to an existence confirming command. Therefore, the existence confirming command is returned to the main node 60 from only the satellite node 63 (S node 2, ID=D) whose M port is connected to the S port P2 of the satellite node 61. Thus, the main node 60 recognized that the M port P1 of the satellite node 63 (S node 2, ID=D) is connected to the S port P2 of the satellite node 61, and that there are topology unconfirmed S ports P0, P2 and P3 in the satellite node 63 (S node 2, ID=D).

Further, when the S port P3 of the satellite node 61 is selected as the XSP, at Step S35, only the "port P3 of the satellite node 61" and the S ports on the route are permitted to transfer a satellite packet, and the satellite node 61 is prohibited from responding an existence confirming command. Therefore, the existence confirming response is not returned to the main node 60 ("NO" at Step S38). Since the main node 60 merely confirms the topology, the main node 60 does not confirm whether any node is connected to the P3 of the satellite node 61 or not. Therefore, as shown in FIG. 16E, "destination unconfirmed" (indicated by a mark "**" in FIG. 16) is recorded in a destination ID field for the port P3 of the satellite node 61 (S node 0) in the network structure data.

The main node 60 carries out the processes at Step S34 to Step S41 until any topology unconfirmed S port (one indicated by the mark "*") disappears on the network structure data to check all S ports of all of the satellite nodes (S node 0, 1, 2) 61 to 64 on the audio network system shown in FIG. 7 one by one in turn. Thus, the main node 60 can detect all of the satellite nodes 61 to 64 that exist on the audio network system and the connecting wire (route) utilized to transfer a main packet and a satellite packet between nodes. The main node 60 can detect topology (network structure) shown with the solid lines in FIG. 7B (dotted-line portions in FIG. 7B are not detected).

FIG. 16F shows the content of the network structure data after all S ports of all of the satellite nodes (S node 0, 1, 2, 3) 61 to 64 are checked. The main node 60 carries out management and control of the audio network system on the basis of the network structure data for all ports of all of the satellite nodes (S node 0, 1, 2, 3) 61 to 64, which are generated by the topology detecting process. More specifically, it is possible to display the detected topology on the display section 44, to monitor an operation state of each satellite node included in the topology, and to remotely control each of the satellite nodes.

In this regard, a concrete example of "the route" at Step S35 described above will be described. For example, in the case where the S port P0 of the satellite node 62 (S node 1) is set to the XSP, the satellite node on "the route" is the satellite node 61 (S node 0), and the S port on "the route" is the S port P1 of the satellite node 61. "The route" is turned out by referring to the network structure data, and tracking the route to the upstream side in turn from the satellite node having the XSP as a starting point, an M port of the satellite node→connecting wire→an S port of a next satellite node→an M port of the satellite node→connecting wire . . . until arrival of the main node 60.

In the case where a topology check for all S ports of all of the satellite nodes (S node 0, 1, 2, 3) 61 to 64 is terminated ("NO" at Step S41), the main node 60 generates a transfer permitting command for permitting to transfer the received satellite packet for all S ports that the node has, adds a broadcast ID thereto, and transmits it with the main packet (Step S42). When this command is received, the control section 17 of each of the satellite nodes 61 to 64 sets prohibited port data for permitting its own all S ports (three ports other than the M port) to transfer the satellite packet to the control data register 18. This is because in order to remotely control each of the satellite nodes 61 to 64 by the main node 60, it is inconvenient unless permission to transfer a satellite packet is set to each S port of each of the satellite nodes 61 to 64.

By carrying out the topology detecting process described above, the main node 60 can detect topology of the audio network system by means of a simple communication protocol (the "existence confirming command" from the main node, the "existence confirming response" from the satellite node and the "satellite packet transfer prohibiting/permitting command for each S port" against the satellite node, and the "response prohibiting/permitting command against each satellite node"). At this time, each of the satellite nodes 61 to 64 may merely carry out very simple processes (response to "existence confirming command", remote control in accordance with the transfer prohibiting/permitting command, and remote control in accordance with the response prohibiting command), and complex processes such as a process to detect neighboring nodes, which has been carried out when to generate a conventional routing table, are not required.

This topology detecting process is suitable for application for presenting topology (network structure) of the audio network system to a user in the main node 60. When the control section 38 of the main node 60 terminates topology detection for all S ports of all of the satellite nodes (S nodes 0, 1, 2, 3) 61 to 64, it is possible to display the whole image of the detected topology on the display section 44 on the basis of the network structure data. Here, the whole image of the topology displayed on the display section 44 is a connection status between nodes showing the route through which the main packet is to be transferred, shown in FIG. 7B with heavy lines. This allows the user to confirm topology of the audio network system by means of the display screen of the display section 44. In this regard, a display form of the topology to be displayed on the display screen may be a form to graphically display the topology by means of "block images" schematically indicating the nodes and "lines" indicating the cables, or the topology may be presented by means of character information.

In this regard, the topology may not be displayed on the display section 44 after all S ports of all of the satellite nodes (S nodes 0, 1, 2, 3) 61 to 64 have been checked (after topology of the whole network is detected). The display content on the display section 44 may be updated whenever topology for each S port of each of the satellite nodes 61 to 64 is detected, whereby a range of the topology to be displayed may be expanded gradually.

Further, in the case where the configuration of the audio network system is a configuration in which main nodes are duplexed as shown in FIG. 2 (configuration of an audio network system having a plurality of main nodes), only any one of them becomes a main node, and the other nodes carry out an operation as a satellite node. Therefore, in the topology detecting process described above, each of the main nodes that operate as a satellite node is substantially regarded as a satellite node. Namely, each S port of the main node that operates as a satellite node is selected as a check target port XSP for topology detection.

<Confirmation of Connection (Detection of Spare Wire)>

In the topology detecting process described with reference to FIG. 17, all of the satellite nodes 61 to 64 that exist on the audio network system, and connecting wire (route) utilized for transfer of the main packet and the satellite packet are detected. Therefore, for example, in FIG. 7B, unlike the connecting wire between the S port P2 of the satellite node 62 (S node 1) and the S port P0 of the satellite node 63 (S node 2) (connecting wire shown with dotted lines), "spare wire" that is not utilized to transfer a main packet and a satellite packet is not detected. At the stage that the topology detecting process is terminated, "destination unconfirmed" is recorded in the network structure data for each of all S ports other than the ports on the route utilized to transfer a main packet and a satellite packet (see FIG. 16F).

Figure 22:
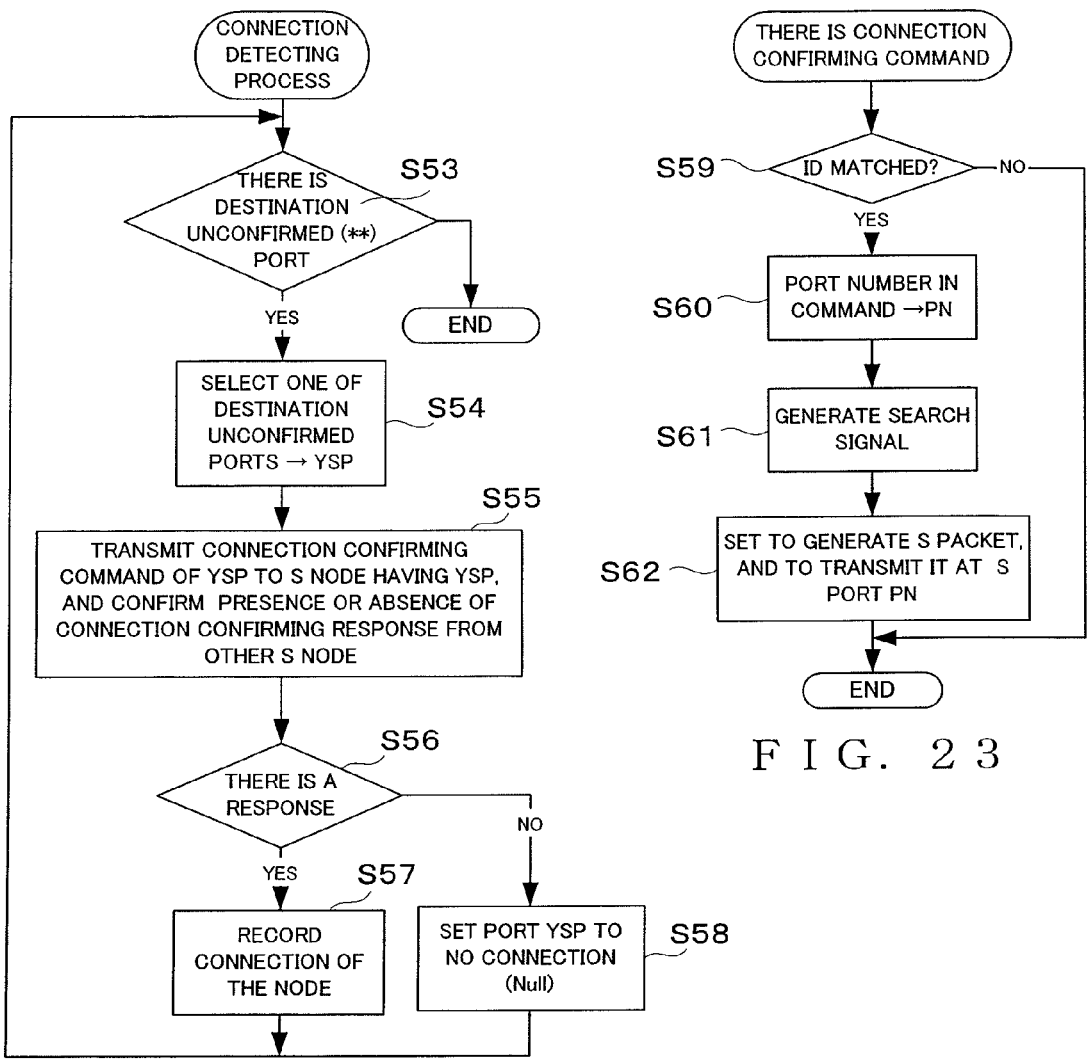
FIG. 22 is a flowchart showing an example of a connection (spare wire) detecting process in the main node.

The control section 38 of the main node 60 carries out the "connection detecting process" after Step S42 in FIG. 17 (after the topology detecting process). FIG. 22 is a flowchart showing an example of the connection detecting process. At Step S53, the control section 38 confirms whether or not there is any destination unconfirmed port ("") in the network structure data. In the case where there are destination unconfirmed ports ("YES" at Step S26), the control section 38 selects one of the destination unconfirmed ports as a check target port YSP of the connection detecting process (Step S54**). In this regard, a destination unconfirmed port of the plurality of S ports in each of the satellite nodes and a destination unconfirmed port of the plurality of ports in the main node are included in the "destination unconfirmed port(s)".

At Step S55, the control section 38 transmits a connection confirming command for confirming connection to the selected check target port YSP to the satellite node having the YSP, and confirms whether or not there is a connection confirming response from the other satellite nodes (destination of the YSP) against the connection confirming command. Namely, the main node 60 generates a connection confirming command including a port number indicating the YSP, adds the ID of the satellite node having the YSP to the connection confirming command to transmit it with the main packet, and receives a response to the connection confirming command. In this regard, in the case where the selected port YSP is a port of the main node 60, at Step S55, in place of transmission of the connection confirming command addressed to the satellite node, a search signal the same as a search signal (will be described later) is generated to be set to the instruction register 35, the M packet generating and transmitting section 34 is caused to generate a satellite packet including the search signal, and it is transmitted from the YSP immediately after a satellite packet period.

Figure 23:
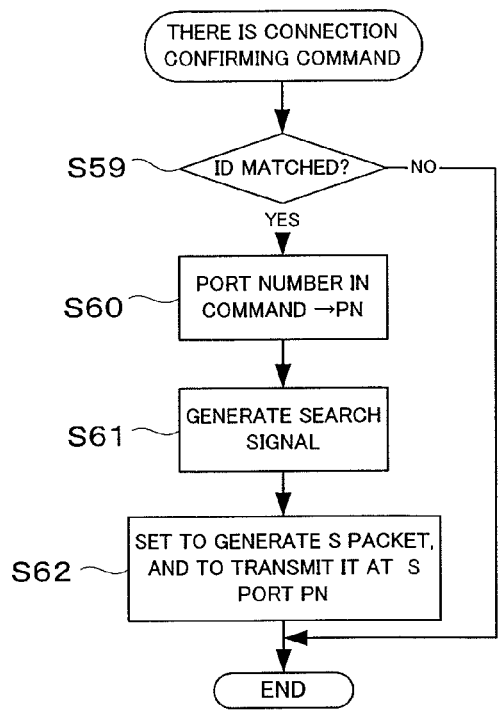
FIG. 23 is a flowchart for explaining an operation in response to a connection confirming command in the satellite node.

FIG. 23 is a flowchart for explaining procedures of a process that the control section 17 of the satellite node carries out in connection with the "connection detecting process". This process is carried out when the connection confirming command from the main node 60, which is extracted from the main packet, is written into the instruction register 15 and the control section 17 receives the connection confirming command. At Step S59, the control section 17 compares the ID added to the connection confirming command with its own ID to check whether or not the command is addressed to the satellite node itself. In the case where the connection confirming command is addressed to the satellite node itself ("YES" at Step S59), a port number included in the connection confirming command is set to a port number variable PN as a search target (Step S60), and a search signal for searching whether there is connection of the node or not is generated (Step S61). The control section 17 then sets the generated search signal to the response register 19, and the control data register 18 and the response register 19 are set up so as to transmit the satellite packet including the search signal from the S port PN indicated by the port number variable PN (Step S62). Thus, the receiving and transferring section 12 carries out the process of FIG. 20, and generates the satellite packet including the search signal to transmit it from the S port PN (=YSP) at the timing to transmit the satellite packet (timing of a clock signal of the lead of the satellite packet period).

Figure 24:
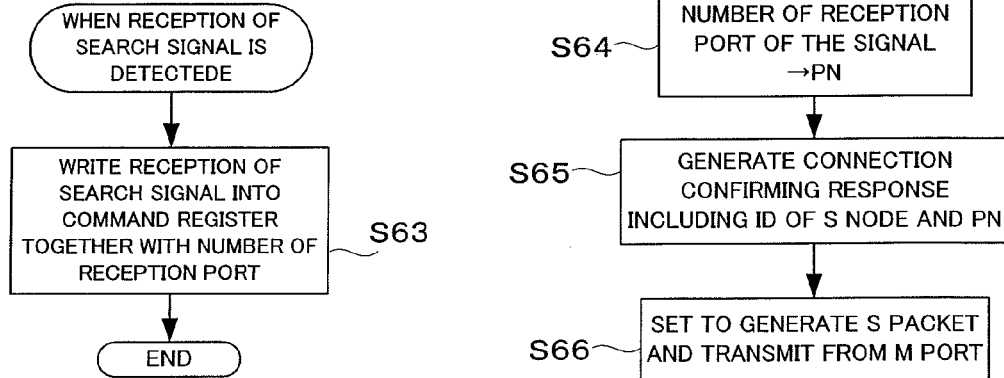
FIG. 24 is a flowchart for explaining an operation when reception of a search signal is detected in the satellite node.

In the case where any S port of any satellite node is connected to the YSP, the satellite packet including the search signal transmitted from the YSP is received at the S port of the satellite node for the destination. In the case where the search signal is included in the satellite packet, the receiving and transferring section 12 of the satellite node in which the satellite packet is received carries out a process of FIG. 24, and writes information indicating that the search signal is received and a port number of the received S port into the instruction register 15 (Step S63). In this regard, in the case where the satellite node receives the satellite packet including the "search signal", the transferring process of FIG. 13 is not carried out for the satellite packet including the "search signal".

Figure 25:
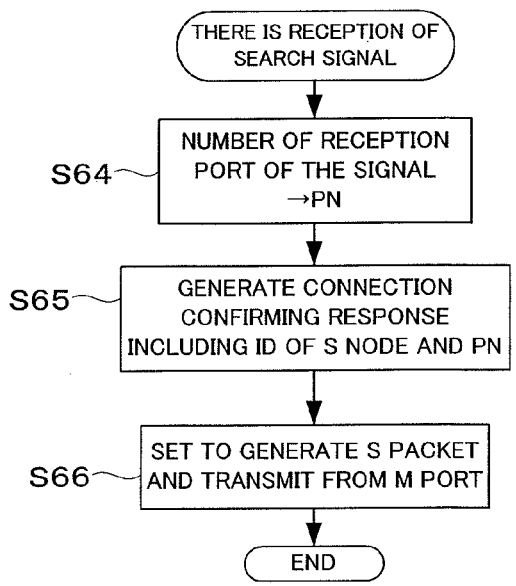
FIG. 25 is a flowchart for explaining an operation in response to the search signal in the satellite node.

Then, when information indicating that the search signal is received from the instruction register 15 and the port number are received, the control section 17 of the satellite node carries out a process shown in a flowchart of FIG. 25. Namely, the process of FIG. 25 is a process carried out by the control section 17 of the satellite node that receives the search signal. The control section 17 sets the received port number (indicating the port receiving the search signal) to a port number variable PN (Step S64), and generates a connection confirming response including the ID of the satellite node and the port number variable PN (Step S65). The control section 17 then generates a satellite packet including the connection confirming response, and sets the response register 19 so as to transmit the satellite packet from the M port (Step S66). Thus, the receiving and transferring section 12 carries out the process of FIG. 20, and generates a satellite packet including the connection confirming response and transmits it from the M port at the timing to transmit the satellite packet. Thus, the connection confirming response is sent back to the main node 60. Here, it should be noted that the response (connection confirming response) to the connection confirming command is not returned by the satellite node having the YSP, but by the node for destination of the YSP.

Returning to FIG. 22, when the control section 38 of the main node 60 receives the satellite packet including the connection confirming response ("YES" at Step S56), information on the satellite node that sends the connection confirming response back (an ID of the node and a port number variable PN) is recorded in the network structure data as a destination of the check target port YSP (Step S57). Further, in the case where there is no connection confirming response within predetermined time ("NO" at Step S56), it is determined that no node is connected to the check target port YSP, and "no connect (=Null)" for the check target port YSP is recorded in the network structure data (Step S58).

The connection detecting process is repeatedly carried out so long as there is any connection unconfirmed port, and is terminated when there is no connection unconfirmed port ("NO" at Step S53). In this regard, although the flowchart of FIG. 22 is drawn so that the connection detecting process is continuously repeated so long as there is any connection unconfirmed port, the connection detecting process may be interrupted in the middle thereof and other process may be cut thereinto.

A state where spare wire is detected in the audio network system shown in FIG. 7 by the "connection detecting process" described above will be described. Since there is no connection confirming response to the connection confirming command for the destination unconfirmed port P1 of the main node 60 and the destination unconfirmed S port P3 of the satellite node 61, "no connection (=Null)" is recorded in the network structure data (a state of FIG. 16G).

Figure 7C:
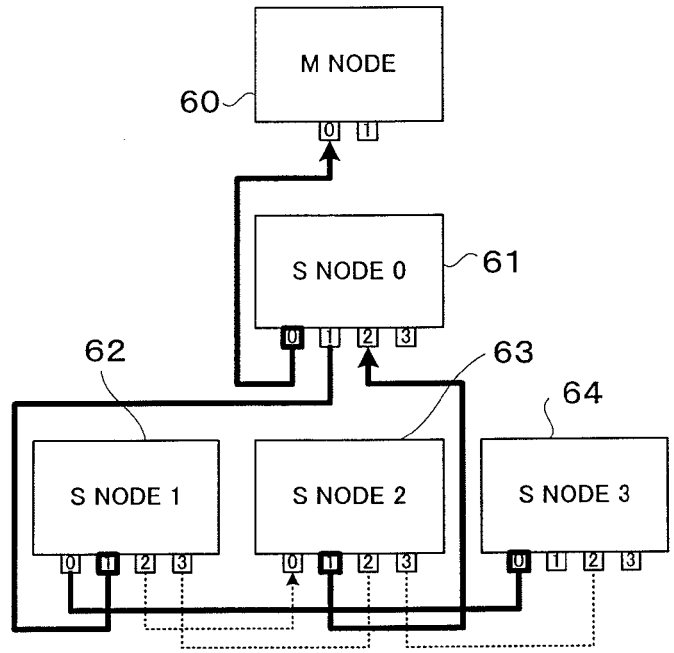

The destination unconfirmed ports of the satellite node 62 (S node 1) are a S port P2 and a S port P3. In the case where the S port P2 is selected as a check target port YSP, the main node 60 transmits the connection confirming command for confirming connection of the port P2 to the satellite node 62 (with the main packet). In FIG. 7C, a broken-line arrow extending from the S port P2 of the satellite node 62 (S node 1) indicates a flow of this "search signal". The satellite node 63 (S node 2) that receives the search signal sends a connection confirming response including its own ID (=D) and the port number (S port P0), from which the search signal is received, back to the main node 60 (with the satellite packet). In FIG. 7C, solid-line arrows (an arrow entering the S port P2 of the "S node 0" from the M port P1 of the "S node 2" and an arrow entering the port P0 of the "M node" from the M port P0 of the "S node 0") indicate a flow of the connection confirming response. The main node 60 detects that the YSP is a destination of the S port P2 of the S node 1 by means of the connection confirming response. In the network structure data, the "destination ID=D" and the "port number=P0" are recorded for the S port P2 of the S node 1, and the "destination ID=C" and the "port number=P2" are recorded for the S port P0 of the S node 2 (ID=D).

Figure 7D:
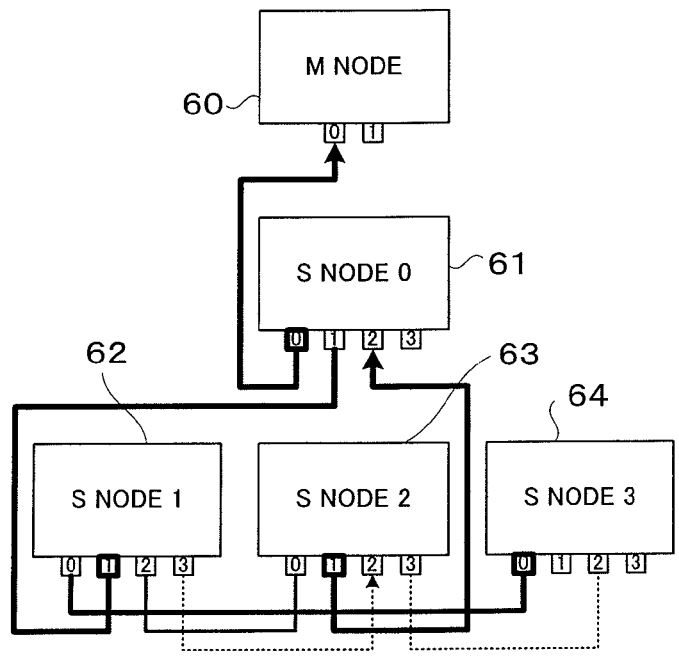

FIG. 7D shows a state where connecting wire (spare wire) between the S port P2 of the satellite node 62 (S node 1) and the S port P0 of the satellite node 63 (S node 2) is detected, wherein the detected spare wire is indicated by solid lines (the "route" is indicated by a solid line thinner than the heavy line). At this state, a destination unconfirmed port of the satellite node 62 (S node 1) is only the S port P3. When the main node 60 transmits a connection confirming command for confirming connection of the port P3 to the satellite node 62, the satellite node 62 transmits a search signal (satellite packet) according to the connection confirming command from the S port P3 (in FIG. 7D, a flow of a broken-line arrow extending from the P3 of the "S node 1"). The satellite node 63 (S node 2) that receives the search signal replies a connection confirming response including its own ID (=D) and the port number (S port P2), from which the search signal is received, to the main node 60 (in FIG. 7D, a flow of a solid-line arrow entering the S port P2 of the "S node 0" from the M port P1 of the "S node 2" and a solid-line arrow entering the port P0 of the "M node" from the M port P0 of the "S node 0"). The main node 60 detects a destination of the S port P3 of the S node 1 as the YSP by means of this connection confirming response. In the network structure data, the "destination ID=D" and the "port number=P2" are recorded for the S port P3 of the S node 1, and the "destination ID=C" and the "port number=P3" are recorded for the S port P2 of the S node 2 (ID=D).

Hereinafter, all of destination unconfirmed ports are checked in the similar manner. When the connection detecting process for all ports of all nodes in the audio network system is terminated, as shown in FIG. 16H, information on the destinations for all ports of all nodes is recorded in the network structure data. Thus, the main node 60 can detect a whole configuration of the audio network system including not only topology but also spare wire (redundant section).

According to the connection (spare wire) detecting process described above, the main node 60 can detect spare wire of each of the satellite nodes 61 to 64 by a simple communication protocol ("connection confirming command" from the main node, "search signal" from the satellite node and "connection confirming response"). Each of the satellite nodes 61 to 64 may merely carry out simple processes (transmission of the "search signal" in accordance with the "connection confirming command" and transmission of the "connection confirming response" in accordance with the "search signal"), and complex processes such as a process to detect neighboring nodes that has been carried out when to generate a conventional routing table are not required.

By carrying out the connection detecting process for all ports, the control section 38 of the main node 60 can display the spare wire detected by the connection detecting process on the display section 44 so as to add the spare wire to display content of the topology (network structure) according to the detection result of the topology detecting process described above. Thus, the user can confirm the whole audio network system including the spare wire on the display screen of the display section 44. In this regard, the whole display form of the audio network system displayed on the display screen may be a form to graphically display the audio network system by means of "block images" schematically indicating the nodes and "lines" indicating the cables as described above, or the audio network system may be presented by means of character information.

In this regard, the control section 38 does not need to wait for update of display of the display section 44 until the connection detecting process for all ports is terminated, and may update display of the display section 44 whenever connection of the destination unconfirmed port is detected, whereby the detection result may be reflected to the display content of the display section 44.

<Operation and the Like by User>

Figure 26:
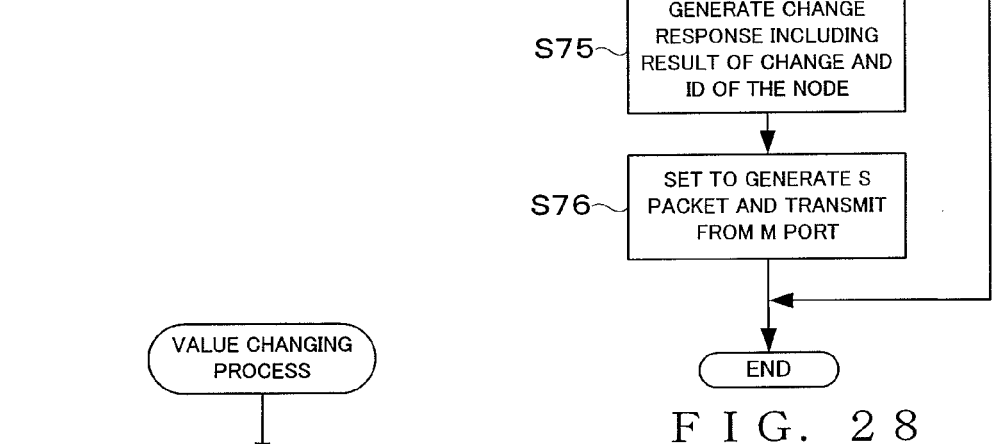
FIG. 26 is a flowchart for explaining an operation when a screen selecting (screen switching) operator is operated in the main node.

On the display section 44, not only the screen to display a configuration of the audio network system, but also a screen to display other information such as values of various kinds of parameters for each satellite node and the like are displayed, for example. The user operates an operator for screen selection included in the operator 43, whereby switching of screens to be displayed on the display section 44 is instructed, for example. When the operator for screen selection is operated, the control section 38 of the main node 60 carries out control to change the screen displayed on the display section 44 into a new screen selected by the operation of the operator (Step S67 in FIG. 26). Thus, the user can switch a screen displayed on the display section 44 to a desired screen. In this case, parameters displayed on the screen are respectively assigned to operators for changing values included in the operator 43. In this regard, by providing one operator for changing values and displaying a cursor on a displayed parameter, a parameter at a position at which the cursor is placed may be assigned to an operator for changing the value.

By operating one of the operators for changing values to adjust a value of the parameter assigned to the operator, the user can control an operation of the main node 60 (in the case where the parameter is a parameter for the main node), or remotely control an operation of any satellite node (in the case where the parameter is a parameter for the satellite node). For that reason, the main node 60 stores data on parameters for the main node 60 itself (a kind of parameter, a variable range of the value of the parameter and the like) and data obtained by copying data on parameters for the satellite nodes (data on a parameter for remote control). In a current memory for storing current values of various kinds of parameters, a region for storing the values of the parameters for the main node 60 itself and a region for storing the values of the parameters for remote control are provided. The region for remote control is not fixed, and is changed depending on the satellite nodes that exist in the audio network system. Namely, in detection of the topology, when existence of a new satellite node is confirmed, a region for storing parameters for the satellite node is added. Further, when the satellite node that has existed until that time becomes absent, a region for storing parameters for the satellite node is deleted. On the other hand, the satellite node subjected to remote control stores only data on parameters for itself, in the current memory for storing current values of various kinds of parameters, only a region for storing the values of the parameters for itself is provided.

Further, the parameters of each node are parameters for controlling each block of the node (see FIG. 5), and particularly, the parameters of the signal processing sections 21, 32 include a parameter of the filter for controlling frequency characteristics of the audio signal, a parameter of the compressor for controlling compression or expansion of change in a level of the audio signal, a parameter of the delay for controlling delay of the audio signal, and a parameter of the damper for controlling a level of the audio signal.

Further, in the parameters for the satellite node, a parameter of a "reception channel number" indicating that a signal of any channel of the audio signals of the eight channels in the main packet is received in the satellite node is included.

Figure 27:
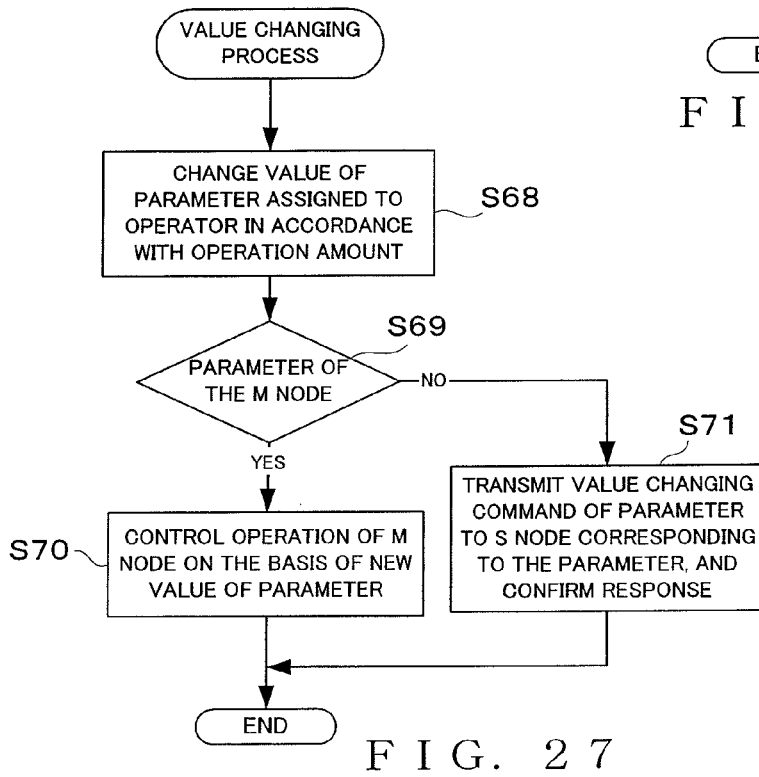
FIG. 27 is a flowchart for explaining an operation when a value changing operator is operated in the main node.

FIG. 27 is a flowchart showing a process carried out by the control section 38 when an operator for changing a value is operated in the main node 60. At Step S68, the control section 38 changes a value of a parameter assigned to the operator in accordance with an operation amount of the operator. In the case where the parameter assigned to the operator is a parameter for the main node 60 ("YES" at Step S69), the control section 38 controls the operation of the main node 60 on the basis of a new value of the parameter (Step S70).

Further, in the case where the parameter assigned to the operator is a parameter for the satellite node ("NO" at Step S69), the control section 38 generates a value changing command for instructing the satellite not to change the value of this parameter, adds an ID of the satellite node corresponding to this parameter to the value changing command, transmits it with the main packet, and confirms a response corresponding to the command (Step S71). Namely, the control section 38 of the main node 60 transmits a command for changing a value of the parameter to the satellite node corresponding to the parameter, and remotely controls the operation of the satellite node.

Figure 28:
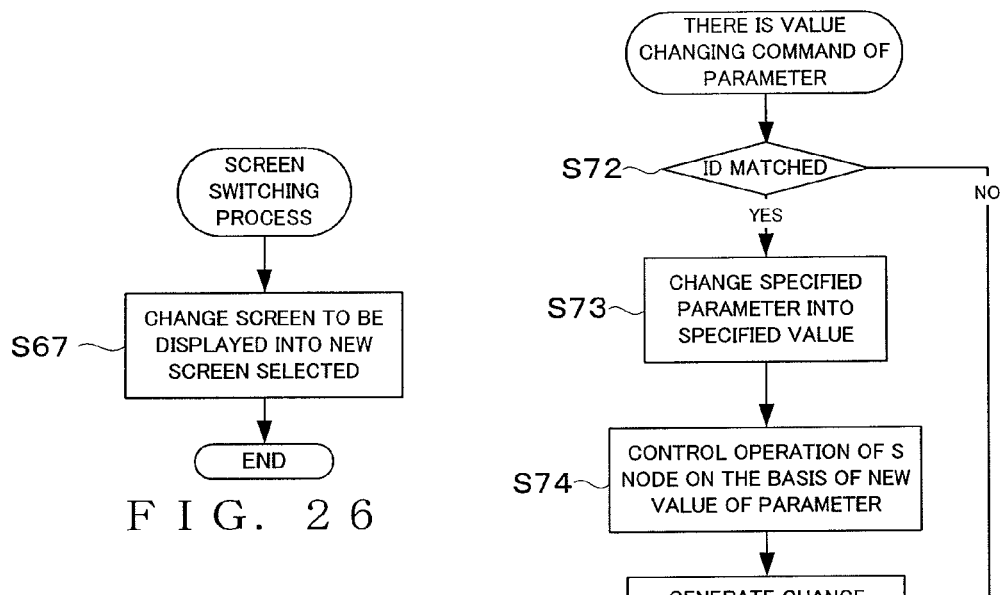
FIG. 28 is a flowchart for explaining an operation in response to a value changing command for parameters in the satellite node.

At Step S71 as described above, the main packet including the value changing command transmitted from the main node 60 arrives at the respective satellite nodes in turn, and in each of the satellite nodes the value changing command is extracted to be set to the instruction register 15. FIG. 28 is a flowchart showing a process carried out by the control section 17 of each of the satellite nodes when the control section 17 of each satellite node receives the value changing command from the instruction register 15. At Step S72, the control section 17 compares the ID added to the value changing command with its own ID to check whether or not the command is addressed to the satellite node itself. In the case where the command is a value changing command addressed to the satellite node itself ("YES" at Step S72), the control section 17 changes the value of the parameter instructed to change the value into the instructed value (Step S73), and controls an operation of the satellite node on the basis of a new value of the parameter (Step S74). The control section 17 then generates a change response including a result of the change of the value and the ID of the satellite node (Step S75), and the satellite packet including the generated change response is generated to be set to the response register 19 so as to be transmitted from the M port (Step S76). Thus, the receiving and transferring section 12 carries out the process of FIG. 20, generates a satellite packet including the change response and transmits it from the M port at the timing to transmit the satellite packet. The main node 60 receives the satellite packet including the transmitted change response, and confirms the response to the value changing command.

Thus, by operating the operator 43 of the main node 60 and changing a value of the parameter of the main node 60, the user can carry out control of sound characteristics of the audio signals of the eight channels to be transmitted from the main node 60 and the like. Further, by remotely changing a parameter of each of the satellite nodes, the user can select the audio signals that the satellite node receives and outputs, and control sound characteristics of the audio signals to be outputted.

As explained above, according to this embodiment, by simple control (FIG. 11) to select one from a plurality of ports in turn and confirm whether or not the main packet arrives at the selected port every predetermined period, each satellite node can automatically find another port at which the main packet arrives every predetermined period at the present stage. Therefore, even in the case where a failure occurs in connection between nodes in the audio network system, a beneficial effect is achieved that it is possible to continue reception of a main packet and an output of an audio signal without using a routing table.

Further, in the audio network system having a plurality of main nodes, one of the plurality of main nodes carries out a main operation, and the other main nodes carry out a satellite operation. Then, when transfer of the main packet is lost on the audio network system, one of the main nodes that carry out the satellite operation is automatically promoted to a main node, and carries out transmission of a main packet (FIG. 12). Therefore, the present invention achieves a beneficial effect that it is possible to continue the operation of the audio network system.

Therefore, according to the present invention, a beneficial effect is achieved that, even in the case where a failure occurs on the audio network system, it is possible to avoid the failure with relatively simple control by automatically changing routes (dynamic routing).

Further, according to the embodiment described above, the main node 1 generates and transmits the packet including a plurality of clock signals (in the embodiment described above, 12 clock signals) embedded at constant intervals (in the embodiment described above, 83.3 μs), which corresponds to the divisor of the packet transmitting cycle (first period (in the embodiment described above, one msec.)) and audio signals of a plurality of channels. Thus, each of the satellite nodes 2a to 2h can generate the sampling clock (96 kHz) in synchronization with reception timing of each clock signal received every constant interval. In this way, each of the satellite nodes 2a to 2h can generate the sampling clock (second clock) on the basis of the reception timing of the clock signal at every period (at every constant time interval) shorter than the packet transmitting cycle. Therefore, a beneficial effect that even in the case where a size of a packet for transmitting an audio signal becomes larger, the sampling clock (second clock) having small lag time with the sampling clock (first clock) of the main node 1 can be generated with high stability compared with a conventional technique in which a word clock in synchronization with timing when the packet reaches the receiving device is generated, is achieved.

Further, according to the embodiment described above, each of the satellite nodes can automatically find another port that the main packet reaches every predetermined period at present time by simple control to select one of the plurality of ports in turn, and to confirm whether the main packet reaches the selected port every predetermined period or not (FIG. 11). Therefore, a beneficial effect that even though a failure occurs in connection between the nodes in the audio network system, reception of the main packet and output of the audio signals can be continued without using a routing table is achieved.

Further, in the audio network system having a plurality of main nodes, one of the plurality of main nodes carries out a main operation, while other main nodes carry out a satellite operation. Then, when transmission of the main packet is lost on the audio network system, one of the main nodes that carry out the satellite operation is automatically promoted to the main node that is to carry out the main operation and transmits the main packet (FIG. 12). Therefore, a beneficial effect that the operation of the audio network system can be continued is achieved.

Therefore, according to the present invention, a beneficial effect that even though a failure occurs in the audio network system, avoiding the failure (dynamic routing) can be carried out with relatively simple control by automatically changing routes is achieved.

Further, according to the embodiment described above, by detecting topology (network structure) of the audio network system using the topology detecting process of FIG. 17, using simple communication protocols, such as transmission of the "existence confirming command" by the main node 1, return of the "existence confirming response" by each of the satellite nodes 2a to 2h that received the "existence confirming command" and remote control to "prohibit transfer" for S port of each of the satellite nodes 2a to 2h, and transmission of the "existence confirming command" by the main node, return of the "existence confirming response" by the satellite node that received the "existence confirming command", remote control to "prohibit transfer" for S ports of satellite nodes, and remote control to "prohibit response" for each of the satellite nodes, the main node can detect connection (topology) of all of the satellite nodes on the network. In this case, each of the satellite nodes is merely required to carry out simple processes such as a response to the "existence confirming command" (existence confirming response) and reception of remote control to prohibit transfer for each of the S ports. Thus, it is no need for the satellite node to carry out complicated processes such as a process to detect a neighboring node by oneself. Therefore, a beneficial effect that topology (network structure) of the network system can be detected with a simple technique without need to carry out a complicated process at each node is achieved. The method of detecting topology whose procedures are shown in FIG. 17 is not suitable for detection of topology that the system uses to control the nodes, but for detection of topology that the system presents its users (for example, topology presented by display on a screen or the like).

Further, according to the present embodiment, by simple communication protocols including transmission of the "connection confirming command" by the main node 1, transmission of the "search signal" by each of the satellite nodes 2a to 2h that received the "connection confirming command", and return of the "connection confirming response" by each of the satellite nodes 2a to 2h that received the search signal, the main node 1 can detect spare wire of each of the satellite nodes 2a to 2h by the connection confirming process of FIG. 22. In this case, each of the satellite nodes 2a to 2h is merely required to carry out simple processes (transmission of the "search signal" according to the "connection confirming command", and transmission of the "connection confirming response" according to the "search signal"), and is not required to carry out complicated processes such as detection of the neighboring nodes. Therefore, a beneficial effect that spare wire of the network system can be detected with a simple technique without need to carry out a complicated process at each node is achieved.

In this regard, although the number of ports of each of the satellite nodes and the number of ports of the main node have respectively been set to four and two in the embodiment described above, the number of ports of each node may be set to an arbitrary number. For example, the number of ports in each of the satellite nodes may be set to ten, and the number of ports in each of the main nodes may be set to four.

Further, although the number of clock signals embedded in the main packet has been set to twelve in the embodiment described above, it is not limited to this. By setting the number of network clocks of the packet transmitting cycle (=transferred bit number) to n, it may be a suitable plurality of clock signals embedded at even intervals each corresponding to a n/m clock (n, m is an integer). Namely, the plurality of clock signals embedded in one main packet may be a plurality of clock signals embedded at constant intervals each corresponding to a divisor of the packet transmitting cycle (first period). In short, the number of clock signals and a length of the embedded interval are not limited to those in the embodiment described above. A plurality of clock signals may merely be embedded in one cycle of the packet transmitting cycle (first period) at even intervals. Further, the sampling clock and the bit width of the audio signal are not limited to 96 kHz and 24 bits, respectively.

Further, although the packet configuration example in which the data of the main packet are divided into the two groups of the even sample group and the odd sample group has been described in the embodiment described above, the data of the main packet may be a packet structure in which the data are divided into a plurality (two or more) of groups.

Further, in the embodiment described above, in the topology detecting process that has been explained with reference to FIGS. 17 to 21, each S port of each satellite node has been set to transferable or not transferable regardless of the kind of received satellite packet. However, the process may be constructed so that only the satellite packet in which the existence confirming response is included is set to transferable or not transferable. Further, in the connection (spare wire) detecting process that has been explained with reference to FIGS. 22 to 25, the case where the satellite node does not transfer the satellite packet when the satellite packet including the "search signal" is received (the transferring process of FIG. 13 is not carried out) has been explained. However, the satellite packet including the "search signal" may also be constructed so as to be transferred from the M port in the transferring process of FIG. 13.

In this regard, so long as the audio network system is constructed by connecting between one port of an arbitrary node and one port of another arbitrary node using the cable, the present invention can be applied to an audio network system having any connection form.

Further, the waiting time at each of Steps S11 and S102 described above is merely an example, and is longer or shorter than the exemplified time length. Alternatively, it may be changed in accordance with setting of the user or the circumstances of the time.

Further, with respect to the predetermined value k at Step S107 in FIG. 12, the predetermined value k of each main node is set to the same value instead of differentiating a predetermined value k set to each main node. When the audio network system is turned on or when the network is reset, timing to start the M port number setting task (FIG. 12) may be differentiated for each main node.

Further, transfer of all of the satellite packets received at the S port specified by the command is prohibited on the basis of the prohibited port data set by the transfer prohibiting command. Since the prohibition of transfer is originally carried out for topology detection, the prohibited port data need only to work on a satellite packet including an existence confirming response, which is utilized for the topology detection. Namely, in the case where a satellite packet including an existence confirming response is received at an S port, transfer is carried out only when the S port is not prohibited from transferring by the prohibited port data. On the other hand, in the case where the satellite packet including other response data is received at the S port, transfer may be carried out in spite of whether the S port is prohibited from transferring the prohibited port data or not. In the case where remote control for the satellite node is carried out while topology detection is carried out in the background, such a manner allows commands from the main node to the satellite nodes to be reduced, and therefore it is far effective.

What is claimed is:

1. An audio network system comprising:
   a main node having at least one port;
   a plurality of satellite nodes each having a plurality of ports; and
   a plurality of connections each connecting one port of one node of the main node and the plurality of satellite nodes to one port of another node of the main node and the plurality of satellite nodes,
   wherein the main node comprises:
   a transmitting section configured to generate a main packet comprising audio signals, and configured to transmit the main packet via the port of the main node, and
   wherein at least one of the plurality of satellite nodes comprises:
   a receiving section configured to select one of the plurality of ports of the satellite node, each port capable of both transmitting and receiving, configured to confirm whether the main packet arrives at the selected port, and configured to, when the main packet arrives at the selected port, receive the main packet via the port by continuing the selection of the port;
   a transmitting section configured to transfer the main packet received by the receiving section via at least two ports other than the selected port of the satellite node; and
   an output section configured to extract an audio signal from the main packet received by the receiving section to output the extracted audio signal.

2. The audio network system as claimed in claim 1, further comprising:
   another main node having one port connected to one port of one node of the plurality of satellite nodes by means of a connection,
   wherein the another main node comprises:
   a receiving section configured to confirm whether or not the main packet arrives at the port of the another main node, and configured to, when the main packet arrives at the port, receive the main packet via the port; and
   a transmitting section configured to, when the main packet does not arrive, generate an additional main packet including audio signals in place of the main node, and configured to transmit the additional main packet via the port of the another main node.

3. The audio network system as claimed in claim 1, further comprising:
   another main node having a plurality of ports, each of the plurality of ports being connected to one port of one node of the plurality of satellite nodes by means of a connection,
   wherein the another main node comprises:
   a receiving section configured to confirm throughout the plurality of ports of the another main node whether or not the main packet arrives at any one port of the plurality of ports of the another main node, and configured to, when the main packet arrives at any one port, receive the main packet via the corresponding one port;
   a first transmitting section configured to, when the main packet arrives at the corresponding one port, transfer the main packet received by the receiving section via a port other than the corresponding one port of the another main node; and
   a second transmitting section configured to, when the main packet does not arrive at the corresponding one port, generate an additional main packet including audio signals in place of the main node, and configured to transmit the additional main packet via the plurality of ports of the another main node.

4. The audio network system of claim 1, wherein the main node further comprises an input section that inputs the audio signals to the main node.

5. The audio network system of claim 1, wherein the output section is further configured to extract the audio signal of a desired channel from the main packet.

6. A method of a satellite node, the method comprising:
   selecting one of a plurality of ports of the satellite node, each port capable of both transmitting and receiving, to receive a main packet from a main node;
   confirming that the main packet arrives at the selected port;
   receiving the main packet via the port by continuing the selection of the port;
   transferring the main packet via at least two ports other than the selected port of the satellite node; and
   extracting an audio signal from the main packet to output the extracted audio signal.

7. A satellite node comprising:
   a receiving section configured to select one of the plurality of ports of the satellite node, each port capable of both transmitting and receiving, configured to confirm whether the main packet arrives at the selected port, and configured to, when the main packet arrives at the selected port, receive the main packet via the port by continuing the selection of the port;

a transmitting section configured to transfer the main packet received by the receiving section via at least two ports other than the selected port of the satellite node; and an output section configured to extract an audio signal from the main packet received by the receiving section to output the extracted audio signal.

\* \* \* \* \*